United States Patent
Manabe et al.

(10) Patent No.: US 10,190,048 B2
(45) Date of Patent: Jan. 29, 2019

(54) LIQUID-CRYSTALLINE MEDIUM AND LIQUID-CRYSTAL DISPLAY COMPRISING THE SAME

(71) Applicant: Merck Patent GmbH, Darmstadt (DE)

(72) Inventors: Atsutaka Manabe, Bensheim (DE); Sven Baran, Babenhausen (DE); Lars Lietzau, Rossdorf (DE); Brigitte Schuler, Grossostheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 15/502,725

(22) PCT Filed: Jul. 13, 2015

(86) PCT No.: PCT/EP2015/001432
§ 371 (c)(1),
(2) Date: Feb. 8, 2017

(87) PCT Pub. No.: WO2016/020033
PCT Pub. Date: Feb. 11, 2016

(65) Prior Publication Data
US 2017/0233652 A1    Aug. 17, 2017

(30) Foreign Application Priority Data
Aug. 8, 2014  (EP) ..................... 14002782

(51) Int. Cl.
| | | |
|---|---|---|
| *G02F 1/1333* | (2006.01) | |
| *C09K 19/30* | (2006.01) | |
| *C09K 19/06* | (2006.01) | |
| *C09K 19/02* | (2006.01) | |

(52) U.S. Cl.
CPC ...... *C09K 19/3098* (2013.01); *C09K 19/0216* (2013.01); *C09K 19/062* (2013.01); *C09K 19/3003* (2013.01); *C09K 19/3048* (2013.01); *C09K 2019/301* (2013.01); *C09K 2019/3004* (2013.01); *C09K 2019/305* (2013.01); *C09K 2019/3009* (2013.01); *C09K 2019/3027* (2013.01)

(58) Field of Classification Search
CPC .............. C09K 19/3098; C09K 19/062; C09K 19/3003; C09K 19/3048; C09K 19/0216; C09K 2019/3004; C09K 2019/3009; C09K 2019/301; C09K 2019/3027; C09K 2019/305
USPC .................................................. 252/299.63
See application file for complete search history.

(56) References Cited

U.S. PATENT DOCUMENTS

| | | | |
|---|---|---|---|
| 5,662,830 A * | 9/1997 | Fujita | ...................... C07C 13/28 252/299.63 |
| 6,066,268 A | 5/2000 | Ichinose et al. | |
| 2010/0304049 A1 | 12/2010 | Bernatz et al. | |
| 2011/0096285 A1 | 4/2011 | Saito | |

(Continued)

FOREIGN PATENT DOCUMENTS

WO    2005/083038 A1    9/2005

OTHER PUBLICATIONS

International Search Report dated Sep. 28, 2015, issued in corresponding PCT/EP2015/001432, 3 pages.

(Continued)

*Primary Examiner* — Geraldina Visconti
(74) *Attorney, Agent, or Firm* — Millen, White, Zelano & Branigan, PC

(57) ABSTRACT

The invention relates to a liquid-crystalline medium, preferably having a nematic phase and negative dielectric anisotropy, which comprises
  a) one or more compounds of formula I

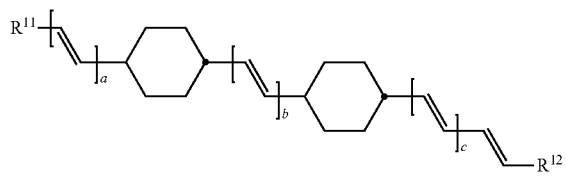

and
  b) one or more compounds selected from the group of compounds of the formulae II and III

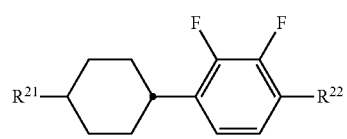

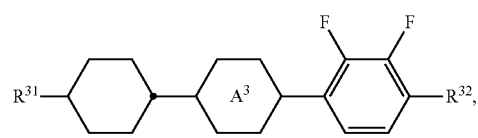

in which the parameters have the respective meanings indicated in claim 1, to the use thereof in an electro-optical display, particularly in an active-matrix display based on the VA, ECB, PALC, IPS or FFS effect, to displays of this type which contain a liquid-crystalline medium of this type, and (Continued)

to the use of the compounds of formula I for reduction of the dispersion of the birefringence of a liquid-crystalline medium which comprises one or more compounds of the formulae II and/or III.

20 Claims, No Drawings

(56) References Cited

U.S. PATENT DOCUMENTS

2011/0193020 A1    8/2011    Klasen-Memmer et al.
2014/0097383 A1    4/2014    Furusato et al.

OTHER PUBLICATIONS

English translation Abstract of WO2005083038A1 published Sep. 9, 2005 (1 page).
Wu, S., "A semi-empirical model for liquid crystal refractive index dispersions", PACS#61.30.-V, 78.20.Ci, 78.40.-q.
Wu, S. et al., "A three-band model for liquid-crystal birefringence dispersion", J. Appl. Phys., vol. 66, No. 11, 1989, pp. 5297-5301.
Abdulhalm, I., "Dispersion Relations for the Refractive Indices and the Effective Birefringence of Liquid Crystals", Mol. Cryst. Liq. Cryst., vol. 197, 1991, pp. 103-108.
Breddels, P.A. et al., "Influence of dispersion on the transmission characteristics of supertwisted nematic effects in liquid-crystal displays", J. Appl. Phys., vol. 62, No. 5, 1987, pp. 1964-1967.
Wu, S., "Birefringence dispersions of liquid crystals", Phys. Rev. A, vol. 33, No. 2, 1986, pp. 1270-1274.

\* cited by examiner

LIQUID-CRYSTALLINE MEDIUM AND LIQUID-CRYSTAL DISPLAY COMPRISING THE SAME

The present invention relates to novel liquid crystalline media, in particular for use in liquid-crystal displays, and to these liquid-crystal displays, particularly to liquid-crystal displays which use the ECB (electrically controlled birefringence) effect, the IPS (in-plane switching) or the FFS (fringe field switching) effect, both with dielectrically negative liquid crystals. The last one is also called UB-FFS (ultra bright FFS) effect occasionally. For the first effect the dielectrically negative liquid crystals are used in a homeotropic initial alignment and the latter two in a homogeneous (i.e. planar) initial alignment. The liquid-crystal media according to the invention are distinguished by a particularly small wavelength dispersion of the birefringence. This also leads to small colour shift in the displays according to the invention.

The principle of electrically controlled birefringence, the ECB effect or DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). Papers by J. F. Kahn (Appl. Phys. Lett. 20 (1972), 1193) and G. Labrunie and J. Robert (J. Appl. Phys. 44 (1973), 4869) followed.

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy $\Delta n$ and values for the dielectric anisotropy $\Delta \varepsilon$ of $\leq -0.5$ in order to be suitable for use for high-information display elements based on the ECB effect. Electro-optical display elements based on the ECB effect have a homeotropic surface alignment (VA technology=vertically aligned). Dielectrically negative liquid-crystal media can also be used in displays which use the so-called IPS (in-plane switching) effect.

According to the present application, however, the IPS or the FFS effect with dielectrically negative liquid crystals in a homogeneous alignment are preferred.

Industrial application of this effect in electro-optical display elements requires LC phases which have to meet a multiplicity of requirements. Particularly important here are chemical resistance to moisture, air and physical influences, such as heat, radiation in the infrared, visible and ultraviolet regions, and direct (DC) and alternating (AC) electric fields.

Furthermore, LC phases which can be used industrially are required to have a liquid-crystalline mesophase in a suitable temperature range and low viscosity.

None of the series of compounds having a liquid-crystalline mesophase that have been disclosed hitherto includes a single compound which meets all these requirements. Mixtures of two to 25, preferably three to 18, compounds are therefore generally prepared in order to obtain substances which can be used as LC phases.

Matrix liquid-crystal displays (MLC displays) are known. Non-linear elements which can be used for individual switching of the individual pixels are, for example, active elements (i.e. transistors). The term "active matrix" is then used, where in general use is made of thin-film transistors (TFTs), which are generally arranged on a glass plate as substrate.

A distinction is made between two technologies: TFTs comprising compound semiconductors, such as, for example, CdSe, or TFTs based on polycrystalline and, inter alia, amorphous silicon. The latter technology currently has the greatest commercial importance worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is located opposite each switchable pixel.

The TFT displays most used hitherto usually operate with crossed polarisers in transmission and are backlit. For TV applications, ECB (or VAN) cells or FFS cells are used, whereas monitors usually use IPS cells or TN (twisted nematic) cells, and notebooks, laptops and mobile applications usually use TN, VA or FFS cells.

The term MLC displays here encompasses any matrix display having integrated non-linear elements, i.e., besides the active matrix, also displays with passive elements, such as varistors or diodes (MIM=metal-insulator-metal).

MLC displays of this type are particularly suitable for TV applications, monitors and notebooks or for displays with a high information density, for example in automobile manufacture or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

Displays which use the ECB effect have become established as so-called VAN (vertically aligned nematic) displays, besides IPS displays (for example: Yeo, S. D., Paper 15.3: "An LC Display for the TV Application", SID 2004 International Symposium, Digest of Technical Papers, XXXV, Book II, pp. 758 and 759) and the long-known TN displays, as one of the three more recent types of liquid-crystal display that are currently the most important, in particular for television applications.

The most important designs may be mentioned here: MVA (multi-domain vertical alignment, for example: Yoshide, H. et al., Paper 3.1: "MVA LCD for Notebook or Mobile PCs . . . ", SID 2004 International Symposium, Digest of Technical Papers, XXXV, Book I, pp. 6 to 9, and Liu, C. T. et al., Paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, Paper 15.4: "Super PVA Sets New State-of-the-Art for LCD-TV", SID 2004 International Symposium, Digest of Technical Papers, XXXV, Book II, pp. 760 to 763) and ASV (advanced super view, for example: Shigeta, Mitzuhiro and Fukuoka, Hirofumi, Paper 15.2: "Development of High Quality LCDTV", SID 2004 International Symposium, Digest of Technical Papers, XXXV, Book II, pp. 754 to 757). More modern versions of the VA effect, are the so called PAVA (photo-alignment VA) and PSVA (polymer-stabilized VA).

In general form, the technologies are compared, for example, in Souk, Jun, SID Seminar 2004, Seminar M-6: "Recent Advances in LCD Technology", Seminar Lecture Notes, M-6/1 to M-6/26, and Miller, Ian, SID Seminar 2004, Seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., Paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular in the switching of grey shades, is still a problem which has not yet been solved to a satisfactory extent.

ECB displays, like ASV displays, use liquid-crystalline media having negative dielectric anisotropy (Δε), whereas TN and to date all conventional IPS displays use liquid-crystalline media having positive dielectric anisotropy. However, presently there is an increasing demand for IPS and FFS displays utilizing dielectrically negative liquid crystalline media.

In liquid-crystal displays of this type, the liquid crystals are used as dielectrics, whose optical properties change reversibly on application of an electrical voltage.

Since in displays in general, i.e. also in displays in accordance with these mentioned effects, the operating voltage should be as low as possible, use is made of liquid-crystal media which are generally predominantly composed of liquid-crystal compounds, all of which have the same sign of the dielectric anisotropy and have the highest possible value of the dielectric anisotropy. In general, at most relatively small proportions of neutral compounds and if possible no compounds having a sign of the dielectric anisotropy which is opposite to that of the medium are employed. In the case of liquid-crystal media having negative dielectric anisotropy for ECB displays, predominantly compounds having negative dielectric anisotropy are thus employed. The liquid-crystal media employed generally consist predominantly and usually even essentially of liquid-crystal compounds having negative dielectric anisotropy.

In the media used in accordance with the present application, at most significant amounts of dielectrically neutral liquid-crystal compounds and generally only very small amounts of dielectrically positive compounds or even none at all are typically employed, since in general the liquid-crystal displays are intended to have the lowest possible addressing voltages.

WO 2009/021671 discloses a dielectrically negative liquid crystalline medium, which comprises a compound of formula

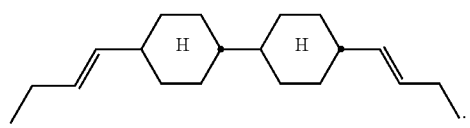

WO 2012/076105 discloses dielectrically negative liquid crystalline media, which may comprises e.g. compounds selected from of the following formulae

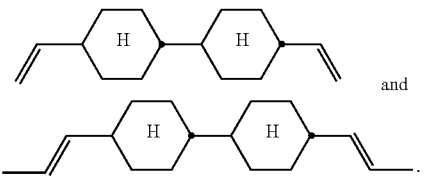

and

For many practical applications in liquid-crystal displays, however, the known liquid-crystal media do not show a sufficiently low dispersion of the birefringence, i.e. a small dependence of the values of both $n_e$ and, in particular, Δn on the wavelength of the light used, especially in the visible range of the spectrum.

Much work has already been invested to practical and theoretical studies of the birefringence dispersions of liquid crystals and their influence on certain electro-optical effects. Some illustrative publications are e.g.

Wu, Sin-Tson: "Birefringence dispersions of liquid crystals", Phys. Rev. A, Vol. 33, No. (2), (1986), pp. 1270-1274;

Breddels, P. A., van Sprang, H. A., and Bruinink, J.: "Influence of dispersion on the transmission characteristics of supertwisted nematic effects in liquid-crystal displays", J. Appl. Phys., Vol. 62, No. (5), (1987), pp. 1964-1967;

Wu, Shin-Tson: "A semi-empirical model for liquid-crystal refractive index dispersions", PACS#61.30.-V, 78.20.Ci, 78.40.-q.;

Wu, Shin-Tson and Wu, Chiung-Seng: "A three-band model for liquid-crystal birefringence dispersion", J. Appl. Phys. Vol. 66, No. (11), (1989), pp. 5297-5301; and Abdulahim, I.: "Dispersion Relations for the Refractive Indices and the Effective Birefringence of Liquid Crystals", Mol. Cryst. Liq. Cryst., Vol. 197, (1991), pp. 103-108.

The liquid-crystal media of the prior art having correspondingly low addressing voltages have relatively low electrical resistance values or a low VHR and often result in undesired shift in colour balance upon observation from an oblique viewing angle. This e.g. leads for displayed "white" colour to a yellowish hue, when the display is viewed from an oblique angle. This problem is due in part to the relatively large wavelength dispersion of the birefringence values of conventional liquid crystals.

A well established method to minimize this problem is the operation of the electro-optical switching elements at an optical retardation set to a value considerably lower than that obtained as the theoretically optimized value, e.g. the one optimised for maximum contrast. This way of operation, however, has the significant drawback of reducing the maximum transmittance. The latter effect, however, is rather undesirable for almost all kinds of electro-optical displays and in particular for mobile displays.

Obviously, the phase range of the liquid-crystal mixture must be sufficiently broad for the intended application of the display.

The response times of the liquid-crystal media in the displays also have to be improved, i.e. reduced. This is particularly important for displays for television or multimedia applications. In order to improve the response times, it has repeatedly been proposed in the past to optimise the rotational viscosity of the liquid-crystal media ($\gamma_1$), i.e. to achieve media having the lowest possible rotational viscosity. However, the results achieved here are inadequate for many applications and therefore make it appear desirable to find further optimisation approaches.

Adequate stability of the media to extreme loads, in particular to UV exposure and heating, is very particularly important. In particular in the case of applications in displays in mobile equipment, such as, for example, mobile telephones, this may be crucial.

The disadvantage of the MLC displays disclosed hitherto is due to their comparatively low contrast, the relatively high viewing-angle dependence and the difficulty in the reproduction of grey scales in these displays, especially when observed from an oblique viewing angle, as well as their inadequate VHR and their inadequate lifetime.

There thus continues to be a great demand for MLC displays having very high specific resistance at the same time as a large working-temperature range, short response times and a low threshold voltage, with the aid of which various grey shades can be produced and which have, in particular, a good and stable VHR.

The invention has the object of providing MLC displays, not only for monitor and TV applications, but also for mobile applications such as e.g. telephones and navigation systems, which are based on the ECB, IPS or FFS effect, do not have the disadvantages indicated above, or only do so to a lesser extent, and at the same time have very high specific resistance values. In particular, it must be ensured for mobile telephones and navigation systems that they also work at extremely high and extremely low temperatures.

Surprisingly, it has been found that it is possible to achieve liquid-crystal displays which have, in particular in ECB, IPS and FFS displays, a low threshold voltage with short response times and at the same time a sufficiently broad nematic phase, favourable, relatively low birefringence (Δn) and, at the same time, a low birefringence dispersion (Δ(Δn)), good stability to decomposition by heating and by UV exposure, and a stable, high VHR if use is made in these display elements of nematic liquid-crystal mixtures which comprise at least one compound, preferably two or more compounds, of formula I and in each case at least one compound, preferably two or more compounds, of formula II, preferably selected from the group of the compounds of the sub-formulae II-1 and II-2, particularly preferably the sub-formulate II-1 and/or II-2, and preferably additionally at least one compound, preferably two or more compounds, selected from the group of the compounds of the formulae III-1 and III-2, preferably of formula III-2, and/or at least one compound, preferably two or more compounds, of the formulae IV and/or V (all formulae as defined herein below).

Media of this type can be used, in particular, for electro-optical displays having active-matrix addressing based on the ECB effect and for IPS (in-plane switching)—or FFS (fringe field switching) displays.

The invention thus relates to a liquid-crystalline medium based on a mixture of polar compounds which comprises at least one compound of formula I and one or more compounds selected from the group of compounds of formulae II and III, preferably one or more compounds of formula II, more preferably in addition one or more compounds of formula III and, most preferably additionally one or more compounds selected from the group of the compounds of formulae IV and V.

The mixtures according to the invention exhibit very broad nematic phase ranges with clearing points ≥70° C., very favourable values for the capacitive threshold, relatively high values for the holding ratio and at the same time good low-temperature stabilities at −20° C. and −30° C., as well as very low rotational viscosities. The mixtures according to the invention are furthermore distinguished by a good ratio of clearing point and rotational viscosity and by a high negative dielectric anisotropy.

Surprisingly, it has now been found that it is possible to achieve liquid-crystalline media having a suitably high absolute value of Δε (|Δε|), a suitable phase range and Δn with a low dispersion of the birefringence, which do not have the disadvantages of the prior-art materials, or at least only do so to a considerably reduced extent.

Surprisingly, it has been found here that the compounds of formula I, as defined herein below, when used, result in considerable, in many cases adequate, dispersion. This is the case, in particular, in most cases in which the parameter $R^{11}$ in the compounds of formula I used denotes alkyl with 1 to 5, preferably 1 to 3, C atoms. The compounds of formula I in which $R^{11}$ denotes alkyl with 1 to 3 C atoms and $R^{12}$ denotes H or methyl are particularly preferably used.

The invention thus relates to compounds of formula I, and to a liquid-crystalline medium having a nematic phase and negative dielectric anisotropy, which comprises
a) one or more compounds of formula I, preferably in a concentration in the range from 1% to 60%, more preferably in the range from 5% to 40%, particularly preferably in the range from 8% to 35%,

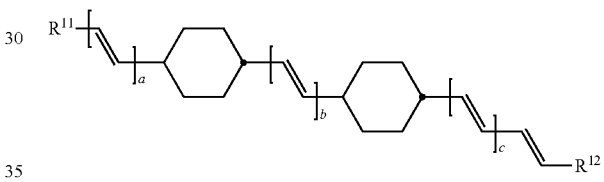

I in which
a, b and c independently of each other denote an integer of 0 or 1,
c most preferably denotes 1,
(a+b+c) is 1, 2 or 3, preferably 1 or 2, most preferably 1,
$R^{11}$ and $R^{12}$ independently of each other denote H or alkyl with 1 to 7 C atoms, preferably H or alkyl with 1 to 53 C atoms, more preferably H or alkyl with 1 to 3 C atoms, and, most preferably,
$R^{11}$ denotes H, methyl or ethyl, and
$R^{12}$ denotes H, methyl, ethyl or propyl, and
b) one or more compounds selected from the group of formulae II and III

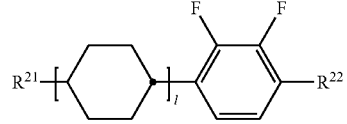

II in which
$R^{21}$ denotes an unsubstituted alkyl radical having 1 to 7 C atoms, preferably a straight-chain alkyl radical, more preferably an n-alkyl radical, most preferably propyl or pentyl, an unsubstituted alkenyl radical having 2 to 7 C atoms, preferably a straight-chain alkenyl radical, particularly preferably having 2 to 5 C atoms, an unsubstituted alkoxy radical having 1 to 6 C atoms or an unsubstituted alkenyloxy radical having 2 to 6 C atoms, $R^{22}$ denotes an unsubstituted alkyl radical having 1 to 7 C atoms, an unsubstituted alkoxy radical having 1 to 6 C atoms or an unsubstituted alkenyloxy radical having 2 to 6 C atoms, and I denotes 0 or 1,

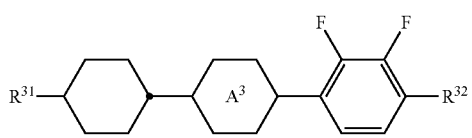

in which
$R^{31}$ denotes an unsubstituted alkyl radical having 1 to 7 C atoms, preferably a straight-chain alkyl radical, more preferably an n-alkyl radical, most preferably propyl or pentyl, or an unsubstituted alkenyl radical having 2 to 7 C atoms, preferably a straight-chain alkenyl radical, particularly preferably having 2 to 5 C atoms,
$R^{32}$ denotes an unsubstituted alkyl radical having 1 to 7 C atoms, preferably having 2 to 5 C atoms, an unsubstituted alkoxy radical having 1 to 6 C atoms, preferably having 1, 2, 3 or 4 C atoms, or an unsubstituted alkenyloxy radical having 2 to 6 C atoms, preferably having 2, 3 or 4 C atoms, and

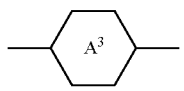

denotes

 or , and
c) optionally, preferably obligatorily, one or more compounds of formula IV,

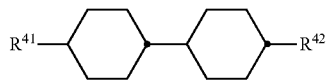

in which
$R^{41}$ denotes an unsubstituted alkyl radical having 1 to 7 C atoms or an unsubstituted alkenyl radical having 2 to 7 C atoms, both preferably having 2 to 5 C atoms, preferably having 2, 3 or 4 C atoms, more preferably a vinyl radical or a 1-propenyl radical and in particular a vinyl radical, and $R^{42}$ denotes an unsubstituted alkyl radical having 1 to 7 C atoms or an unsubstituted alkoxy radical having 1 to 6 C atoms, preferably an n-alkyl radical, particularly preferably having 2, 3, 4 or 5 C atoms, d) optionally, preferably obligatorily, one or more compounds of formula V,

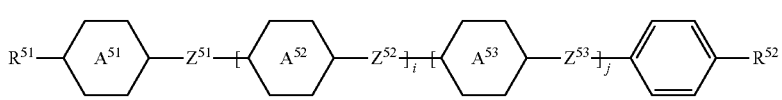

in which
$R^{51}$ and $R^{52}$, independently of one another, have one of the meanings given for $R^{21}$ and $R^{22}$ and preferably denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

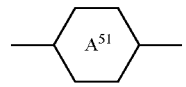

to

, if present, each, independently of one another, denote

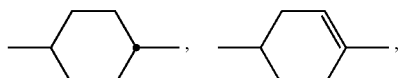

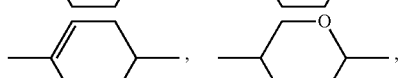

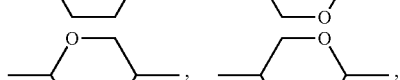

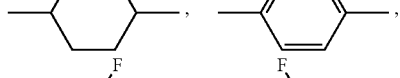

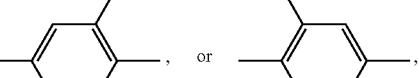

preferably

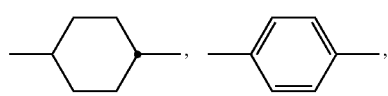

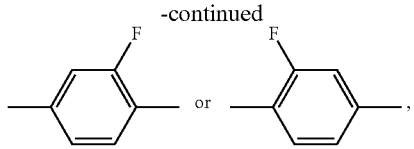 or preferably

denotes

and, if present,

preferably denotes

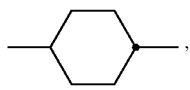

$Z^{51}$ to $Z^{53}$ each, independently of one another, denote —CH₂—CH₂—, —CH₂—O—, —CH=CH—, —C≡C—, —COO— or a single bond, preferably —CH₂—CH₂—, —CH₂—O— or a single bond and particularly preferably a single bond, i and j each, independently of one another, denote 0 or 1, (i+j) preferably denotes 0 or 1.

In the present application, the elements all include their respective isotopes. In particular, one or more H in the compounds may be replaced by D, and this is also particularly preferred in some embodiments. A correspondingly high degree of deuteration of the corresponding compounds enables, for example, detection and recognition of the compounds. This is very helpful in some cases, in particular in the case of the compounds of formula I.

In the present application, alkyl particularly preferably denotes straight-chain alkyl, in particular CH₃—, C₂H₅—, n-C₃H₇—, n-C₄H₉— or n-C₅H₁₁—, and alkenyl particularly preferably denotes CH₂=CH—, E-CH₃—CH=CH—, CH₂=CH—CH₂—CH₂—, E-CH₃—CH=CH—CH₂—CH₂— or E-(n-C₃H₇)—CH=CH—.

Preferably the liquid crystalline media according to the present invention comprise one or more compounds of formula I selected from the following group of compounds of formulae I-1 to I-3, preferably selected from formulae I-1 and I-2, most preferably of formula I-1

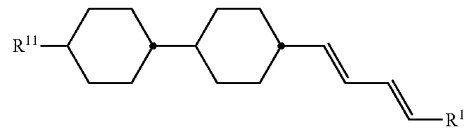

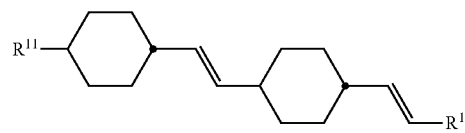

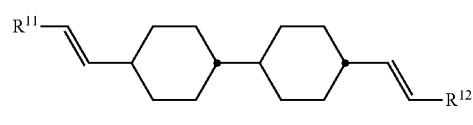

wherein the parameters have the respective meanings, including the same preferred meanings, given above under formula I, and in formula I-1
  $R^{11}$ preferably denotes methyl, ethyl, propyl, butyl or pentyl, more preferably n-propyl, n-butyl or n-pentyl),
  $R^{12}$ preferably denotes H, methyl or ethyl, in formula I-2
  $R^{11}$ preferably denotes methyl, ethyl, propyl, butyl or pentyl, more preferably n-propyl, n-butyl or n-pentyl,
  $R^{12}$ preferably denotes H or methyl, in formula I-3
  $R^{11}$ preferably denotes H, methyl of ethyl, more preferably H or methyl, most preferably H, and
  $R^{12}$ preferably denotes H or methyl, more preferably H.

Preferably the liquid crystalline media according to the present invention comprise one or more compounds of formula I-1 selected from the following group of compounds of formulae I-1a to I-1, preferably selected from formulae I-1a and I-1b, most preferably of formula I-1b

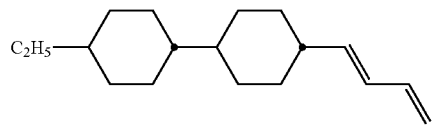

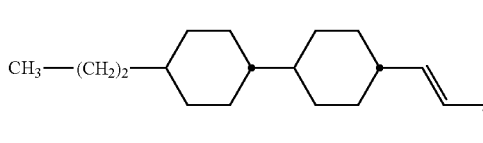

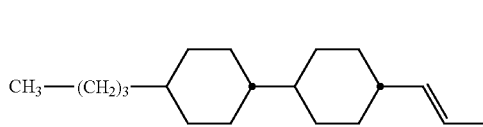

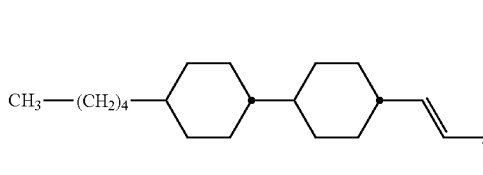

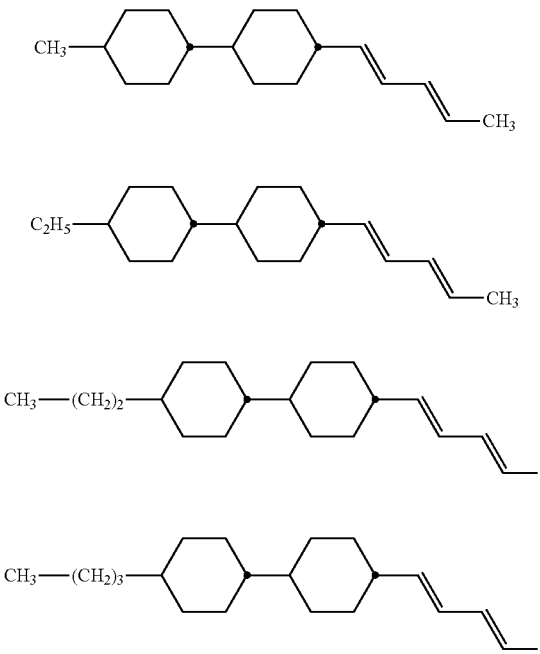

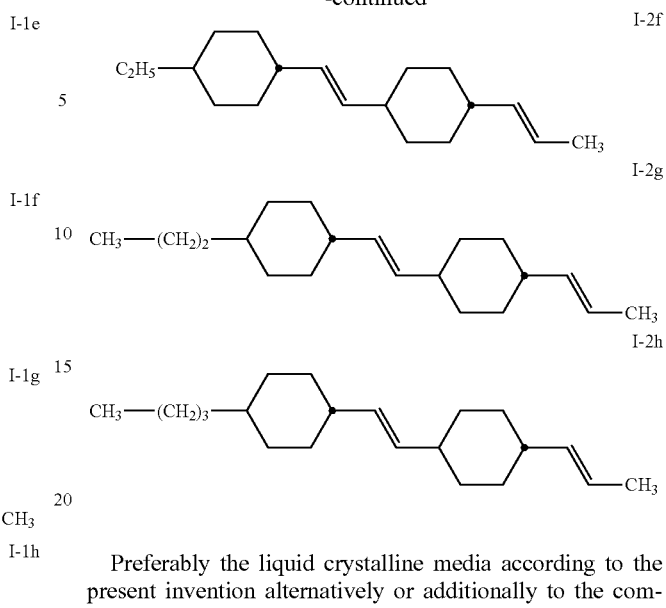

Preferably the liquid crystalline media according to the present invention comprise alternatively or additionally to the compounds of formulae I-1 and/or I-3 one or more compounds of formula I-2 selected from the following group of compounds of formulae I-2a to I-2h, preferably selected from formulae I-2c and I-2d, most preferably of formula I-2c.

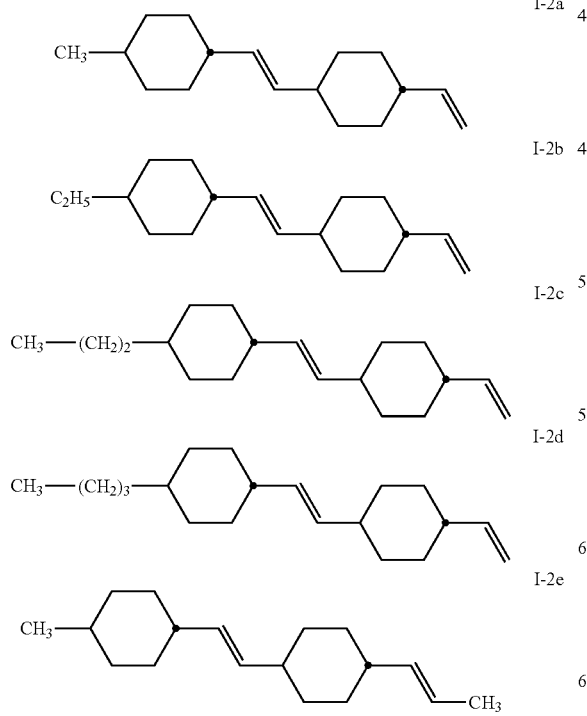

Preferably the liquid crystalline media according to the present invention alternatively or additionally to the compounds of formula I-1 and/or I-2 comprise one or more compounds of formula I selected from the following group of compounds of formulae I-3a to I-3f, preferably selected from formulae I-3a, I-3b, I-3c and I-3f, most preferably of formula I-3a, I-3b and I1-3c.

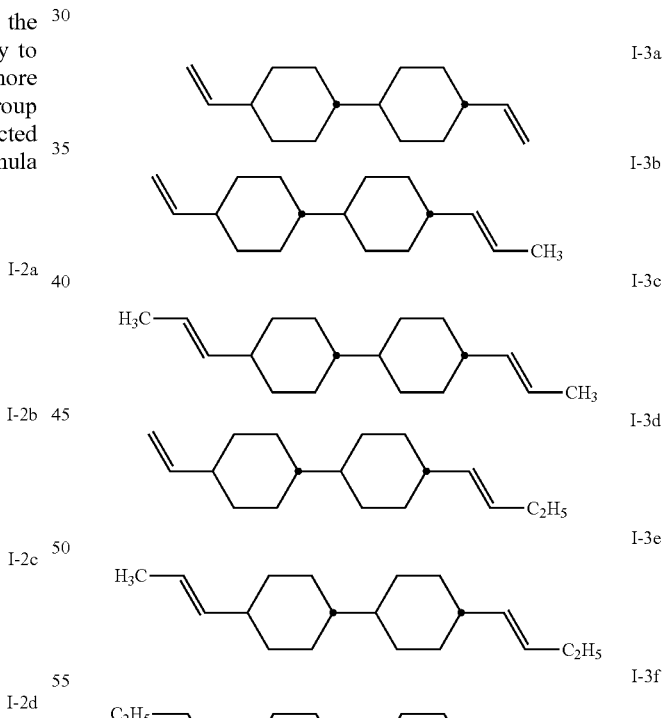

In a preferred embodiment of the present invention, the media according to the invention in each case comprise one or more compounds of formula I selected from the group of the compounds of the formulae I-1 to I-3, preferably selected from the group of the compounds of the formulae (I-1 and I-2) or (I-1 and I-3).

In an even more preferred embodiment of the present invention, the media according to the invention in each case comprise one or more compounds of formula I selected from the group of the following compounds of the formulae I-1a to I-1d.

In a preferred embodiment of the present invention, the media according to the invention in each case comprise one or more compounds of formula I selected from the group of the following compounds of the formulae I-1b.

In an alternative, preferred embodiment of the present invention, the media according to the invention in each case comprise one or more compounds of formula I selected from the group of the following compounds of the formulae I-1f and I-1g.

In a preferred embodiment of the present invention, the media according to the invention in each case comprise one or more compounds of formula II selected from the group of the compounds of the formulae II-1 and II-2, preferably one or more compounds each of formulae II-1 and one or more compounds of formula II-2,

II-1

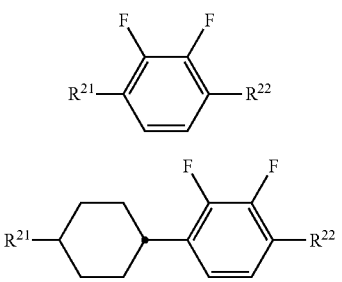

II-2 in which the parameters have the respective meanings given above under formula II, and preferably
in formula II-1
$R^{21}$ and $R^{22}$ independently of each other denote methoxy, ethoxy, propoxy, butoxy (also or pentoxy, preferably ethoxy, butoxy or pentoxy, more preferably ethoxy or butoxy and, most preferably butoxy.
in formula II-2
$R^{21}$ preferably denotes vinyl, 1-E-propenyl, but-4-en-1-yl, pent-1-en-1-yl or pent-3-en-1-yl and n-propyl or n-pentyl and
$R^{22}$ denotes an unsubstituted alkyl radical having 1 to 7 C atoms, preferably having 2 to 5 C atoms, or, preferably, an unsubstituted alkoxy radical having 1 to 6 C atoms, particularly preferably having 2 or 4 C atoms and, most preferably, ethoxy, and In a preferred embodiment of the present invention, the media according to the invention in each case comprise one or more compounds of formula III selected from the group of the compounds of the formulae III-1 and III-2, preferably one or more compounds each of the formulae III-1 and one or more compounds of formula III-2,

III-1

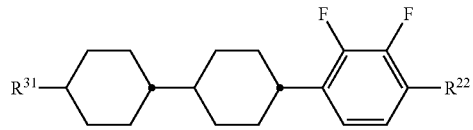

III-2

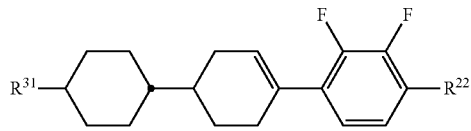

in which the parameters have the respective meanings given above underformula III, and preferably
$R^{31}$ denotes vinyl, 1-E-propenyl, but-4-en-1-yl, pent-1-en-1-yl or pent-3-en-1-yl, n-propyl or n-pentyl and
$R^{32}$ denotes an unsubstituted alkyl radical having 1 to 7 C atoms, preferably having 2 to 5 C atoms, or, preferably, an unsubstituted alkoxy radical having 1 to 6 C atoms, particularly preferably having 2 or 4 C atoms and, most preferably, ethoxy.

In a preferred embodiment of the present invention, the media according to the invention in each case comprise one or more compounds of formula II-1 selected from the group of the following compounds:

II-1a

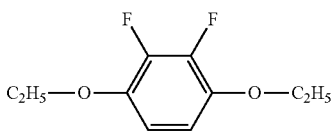

II-1b

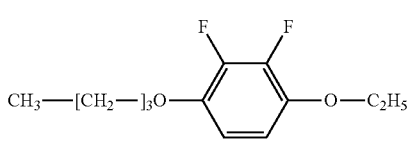

II-1c

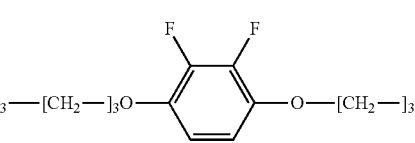

In a preferred embodiment of the present invention, the media according to the invention in each case comprise one or more compounds of formula II-2 selected from the group of the following compounds:

II-2a

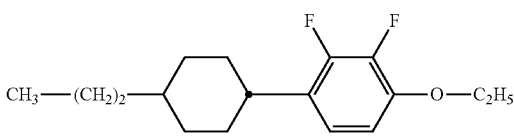

II-2b

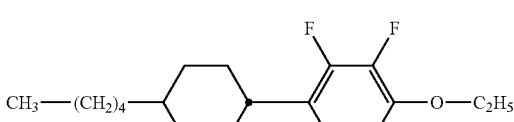

In a preferred embodiment of the present invention, the media according In a preferred embodiment of the present invention, the media according to the invention in each case comprise one or more compounds of formula III-1 selected from the group of the following compounds:

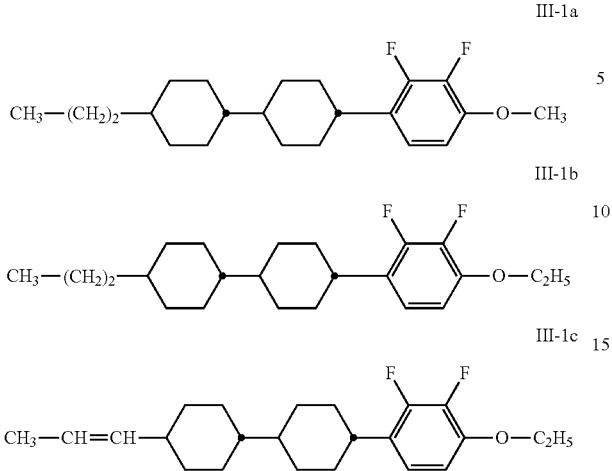

III-1a, III-1b, III-1c

In a preferred embodiment of the present invention, the media according to the invention in each case comprise one or more compounds of formula III-2 selected from the group of the following compounds:

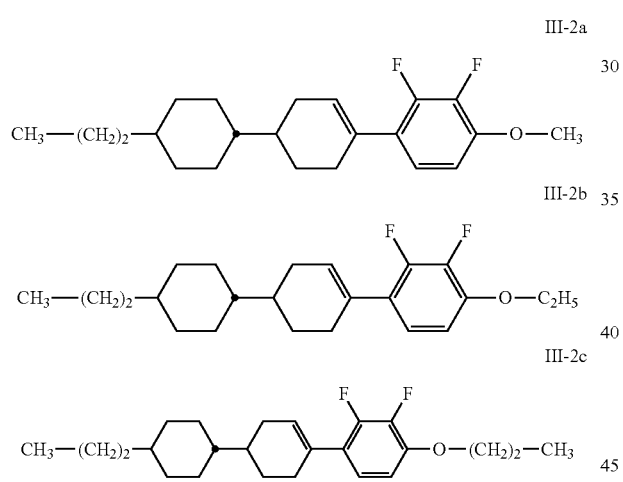

III-2a, III-2b, III-2c

In addition to the compounds of formula I or the preferred sub-formulae thereof, the media in accordance with the present invention preferably comprise one or more dielectrically neutral compounds selected from the group of compounds of the formulae II and III preferably in a total concentration in the range from 5% or more to 90% or less, preferably from 10% or more to 80% or less, particularly preferably from 20% or more to 70% or less.

In a further preferred embodiment, the medium comprises one or more compounds of formula IV

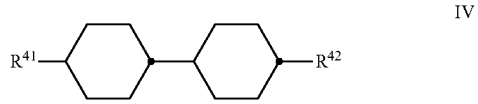

in which
$R^{41}$ denotes an unsubstituted alkyl radical having 1 to 7 C atoms or an unsubstituted alkenyl radical having 2 to 7 C atoms, preferably an n-alkyl radical, particularly preferably having 2, 3, 4 or 5 C atoms, and
$R^{42}$ denotes an unsubstituted alkyl radical having 1 to 7 C atoms or an unsubstituted alkoxy radical having 1 to 6 C atoms, both preferably having 2 to 5 C atoms, an unsubstituted alkenyl radical having 2 to 7 C atoms, preferably having 2, 3 or 4 C atoms, more preferably a vinyl radical or 1-propenyl radical and in particular a vinyl radical.

In a particularly preferred embodiment, the medium comprises one or more compounds of formula IV selected from the group of the compounds of the formulae IV-1 to IV-3, preferably of formula IV-1,

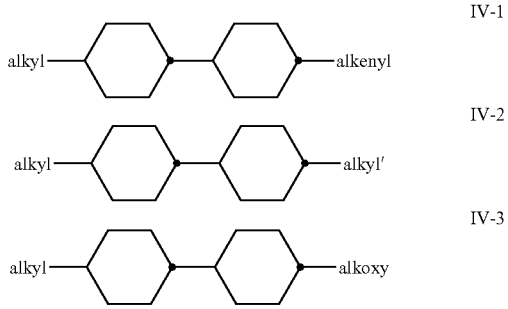

in which
alkyl and alkyl', independently of one another, denote alkyl having 1 to 7 C atoms, preferably having 2 to 5 C atoms,
alkenyl denotes an alkenyl radical having 2 to 5 C atoms, preferably having 2 to 4 C atoms, particularly preferably 2 C atoms,
alkenyl' denotes an alkenyl radical having 2 to 5 C atoms, preferably having 2 to 4 C atoms, particularly preferably having 2 to 3 C atoms, and
alkoxy denotes alkoxy having 1 to 5 C atoms, preferably having 2 to 4 C atoms.

In a particularly preferred embodiment, the media according to the invention comprise one or more compounds of formula IV-1 and/or one or more compounds of formula IV-2.

In a further preferred embodiment, the medium comprises one or more compounds of formula V

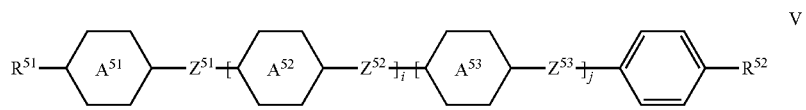

in which
$R^{51}$ and $R^{52}$, independently of one another, have one of the meanings given for $R^{21}$ and $R^{22}$ and preferably denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

to

if present, each, independently of one another, denote

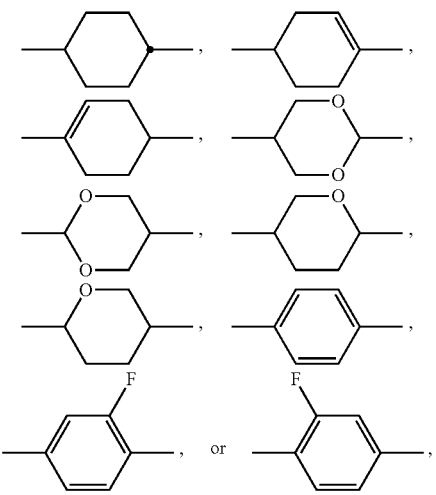

preferably

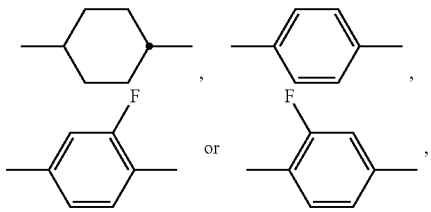

preferably

denotes

and, if present,

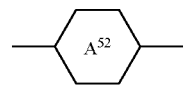

preferably denotes

$Z^{51}$ to $Z^{53}$ each, independently of one another, denote —$CH_2$—$CH_2$—, —$CH_2$—O—, —CH=CH—, —C≡C—, —COO— or a single bond, preferably —$CH_2$—$CH_2$—, —$CH_2$—O— or a single bond and particularly preferably a single bond, i and j each, independently of one another, denote 0 or 1, (i+j) preferably denotes 0, 1 or 2, more preferably 0 or 1 and, most preferably, 1.

The media according to the invention preferably comprise the following compounds in the total concentrations indicated:

1-60% by weight of one or more compounds selected from the group of the compounds of formula I and 5-60% by weight of one or more compounds of formula II, preferably selected from the group of the compounds of the formulae II-1 and II-2 and/or 10-60% by weight of one or more compounds of formula III, preferably selected from the group of the compounds of the formulae III-1 and III-2 and/or 0-60% by weight of one or more compounds of the formulae IV and/or V, where the total content of all compounds in the medium preferably is 95% or more and, more preferably 100%.

In a further preferred embodiment, the media in accordance with the present invention in addition to the compounds of formula I or the preferred sub-formulae thereof, and to the compounds of formulae II and/or III, preferably comprise one or more dielectrically neutral compounds selected from the group of compounds of formulae IV and V preferably in a total concentration in the range from 5% or more to 90% or less, preferably from 10% or more to 80% or less, particularly preferably from 20% or more to 70% or less.

The medium according to the invention in a particularly preferred embodiment comprises one or more compounds of formula II in a total concentration in the range from 5% or more to 50% or less, preferably in the range from 10% or more to 40% or less, and/or one or more compounds of formula III-1 in a total concentration in the range from 5% or more to 30% or less, and/or one or more compounds of formula III-2 in a total concentration in the range from 3% or more to 30% or less.

Preferably the concentration of the compounds of formula I in the media according to the invention is in the range from 1% or more to 60% or less, more preferably from 5% or more to 40% or less, most preferably from 8% or more to 35% or less In a preferred embodiment of the present invention the concentration of the compounds of formula II in the media is in the range from 3% or more to 60% or less, more preferably from 5% or more to 55% or less, more preferably from 10% or more to 50% or less and, most preferably, from 15% or more to 45% or less.

In a preferred embodiment of the present invention the concentration of the compounds of formula III in the media is in the range from 2% or more to 50% or less, more preferably from 5% or more to 40% or less, more preferably from 10% or more to 35% or less and, most preferably, from 15% or more to 30% or less.

In a preferred embodiment of the present invention the concentration of the compounds of formula III-1 in the media is in the range from 1% or more to 40% or less, more preferably either from 2% or more to 35% or less, or, alternatively, from 15% or more to 25% or less.

In a preferred embodiment of the present invention the concentration of the compounds of formula III-2 in the media, if present, is in the range from 1% or more to 40% or less, more preferably from 5% or more to 35% or less and, most preferably, from 10% or more to 30% or less.

The present invention also relates to electro-optical displays or electro-optical components which contain liquid-crystalline media according to the invention. Preference is given to electro-optical displays which are based on the VA, ECB, IPS or FFS effect, preferably on the VA; IPS or FFS effect, and in particular those which are addressed by means of an active-matrix addressing device.

Accordingly, the present invention likewise relates to the use of a liquid-crystalline medium according to the invention in an electro-optical display or in an electro-optical component, and to a process for the preparation of the liquid-crystalline media according to the invention, characterised in that one or more compounds of formula I are mixed with one or more compounds of formula II, preferably with one or more compounds of the sub-formulae II-1 and/or II-2 and/or with one or more compounds of formula III, preferably with one or more compounds of the sub-formulae III-1 and/or III-2, particularly preferably one or more compounds from two or more, preferably from three or more, different formulae thereof and very particularly preferably from all four of these formulae II-1, II-2, III-1 and III-2 and one or more further compounds, preferably selected from the group of the compounds of the formulae IV and V, more preferably with one or more compounds both of formula IV and of formula V.

In a further preferred embodiment, the medium comprises one or more compounds of formula IV, selected from the group of the compounds of the formulae IV-2 and IV-3,

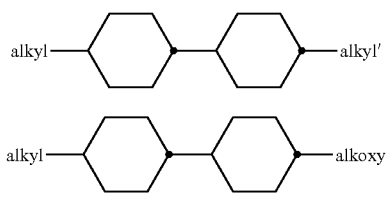

in which
alkyl and alkyl', independently of one another, denote alkyl having 1 to 7 C atoms, preferably having 2 to 5 C atoms, alkoxy denotes alkoxy having 1 to 5 C atoms, preferably having 2 to 4 C atoms.

In a further preferred embodiment, the medium comprises one or more compounds of formula V selected from the group of the compounds of the formulae V-1 and V-2, preferably of formulae V-1,

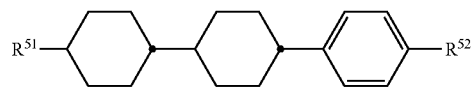

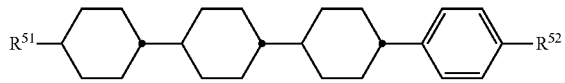

in which the parameters have the meanings given above under formula V, and preferably
$R^{51}$ denotes alkyl having 1 to 7 C atoms or alkenyl having 2 to 7 C atoms, and
$R^{52}$ denotes alkyl having 1 to 7 C atoms, alkenyl having 2 to 7 C atoms or alkoxy having 1 to 6 C atoms, preferably alkyl or alkenyl, particularly preferably alkyl.

In a further preferred embodiment, the medium comprises one or more compounds of formula V-1 selected from the group of the compounds of the formulae V-1a and V-1b,

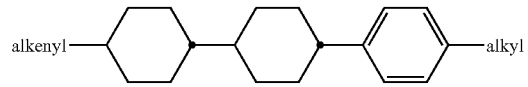

in which
alkyl and alkyl', independently of one another, denote alkyl having 1 to 7 C atoms, preferably having 2 to 5 C atoms, and
alkenyl denotes alkenyl having 2 to 7 C atoms, preferably having 2 to 5 C atoms.

In addition, the present invention relates to a method for the reduction of the wavelength dispersion of the birefringence of a liquid-crystalline medium which comprises one or more compounds of formula II, optionally one or more compounds selected from the group of the compounds of the formulae III-1 and III-2 and/or one or more compounds of formula IV and/or one or more compounds of formula V, characterised in that one or more compounds of formula I are used in the medium.

Besides compounds of the formulae I to V, other constituents may also be present, for example in an amount of up to 45%, but preferably up to 35%, in particular up to 10%, of the mixture as a whole.

The media according to the invention may optionally also comprise a dielectrically positive component, whose total concentration is preferably 20% or less, more preferably 10% or less, based on the entire medium.

In a preferred embodiment, the liquid-crystal media according to the invention comprise in total, based on the mixture as a whole,
20% or more to 60% or less, preferably 25% or more to 50% or less, particularly preferably 30% or more to 45% or less, of the compound of formula I,
20% or more to 60% or less, preferably 25% or more to 50% or less, particularly preferably 30% or more to 45% or less, of compounds of formula II, and 50% or more to 70% or less of compounds of the formulae III-1 and III-2.

The liquid-crystal media in accordance with the present invention may comprise one or more chiral compounds.

Particularly preferred embodiments of the present invention meet one or more of the following conditions, where the acronyms (abbreviations) are explained in Tables A to C and illustrated by examples in Table D.

Preferably the media according to the present invention fulfil one or more of the following conditions.

i. The liquid-crystalline medium has a birefringence of 0.060 or more, particularly preferably 0.070 or more.
ii. The liquid-crystalline medium has a birefringence of 0.130 or less, particularly preferably 0.120 or less.
iii. The liquid-crystalline medium has a birefringence in the range from 0.090 or more to 0.120 or less.
iv. The liquid-crystalline medium has a negative dielectric anisotropy having an absolute value of 2.0 or more, particularly preferably 3.0 or more and, most preferably of 3.5 or more.
v. The liquid-crystalline medium has a negative dielectric anisotropy having an absolute value of 5.5 or less, particularly preferably 4.0 or less.
vi. The liquid-crystalline medium has a negative dielectric anisotropy having an absolute value in the range from 2.5 or more to 4.5 or less, preferably from 3.0 or more to 4.0 or less.
vii. The liquid-crystalline medium comprises one or more particularly preferred compounds of formula I-1 selected from the sub-formulae given below:

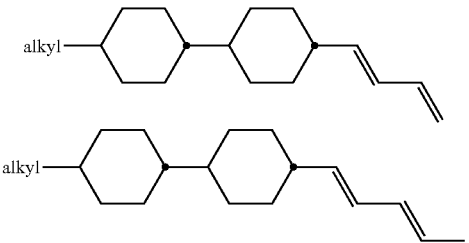

in which alkyl has the meaning given above and preferably, in each case independently of one another, denotes alkyl having 1 to 6, preferably having 2 to 5, C atoms and particularly preferably n-alkyl.
viii. The liquid-crystalline medium comprises one or more particularly preferred compounds of formula I-2 selected from the sub-formulae given below:

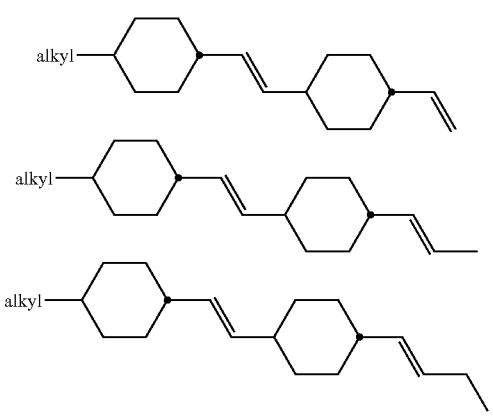

in which alkyl has the meaning given above and preferably, in each case independently of one another, denotes alkyl having 1 to 6, preferably having 2 to 5, C atoms and particularly preferably n-alkyl.
ix. The liquid-crystalline medium comprises one or more particularly preferred compounds of formula I-1 selected from the sub-formulae given below:

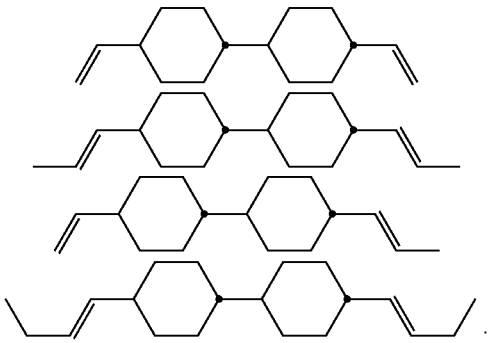

x. The liquid-crystalline medium comprises one or more particularly preferred compounds of formula IV selected from the sub-formulae given below:

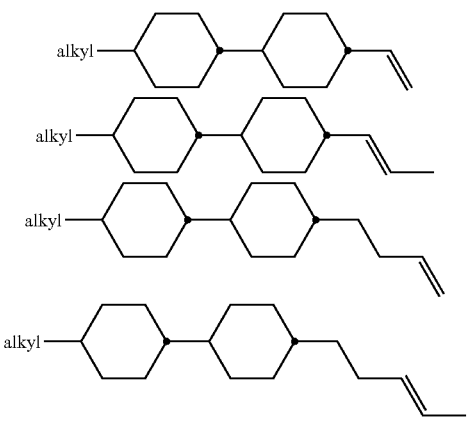

in which alkyl has the meaning given above and preferably, in each case independently of one another, denotes alkyl having 1 to 6, preferably having 2 to 5, C atoms and particularly preferably n-alkyl.
xi. The total concentration of the compounds of formula II in the mixture as a whole is 25% or more, preferably 30% or more, and is preferably in the range from 25% or more to 49% or less, particularly preferably in the range from 29% or more to 47% or less, and very particularly preferably in the range from 37% or more to 44% or less.
xii. The liquid-crystalline medium comprises one or more compounds of formula II selected from the group of the compounds of the following formulae: CC-n-V and/or CC-n-Vm, particularly preferably CC-3-V, preferably in a concentration of up to 50% or less, particularly preferably up to 42% or less, and optionally additionally CC-3-V1, preferably in a concentration of up to 15% or less, and/or CC-4-V, preferably in a concentration of up to 20% or less, particularly preferably up to 10% or less.
xiii. The total concentration of the compounds selected from the group of formulae CC-3-VV, CC-3-VV1, CVC-3-V, CC-V-V, CC-V-V1, CC-1V-V1 and CC-2V-V2 in the mixture as a whole is 5% or more, preferably 10% or more, preferably 15% or more, more preferably 20% or more and, most preferably, 25% or more.

xiv. The media comprise one or more compounds selected from the group of compounds of formulae CC-3-VV, CC-3-VV1 and CVC-3-V.

xv. The media comprise the compound of formula CC-3-VV, preferably in a concentration of 5% or more to 60% or less, more preferably in a concentration of 6% or more to 35% or less.

xvi. The media comprise the compound of formula CVC-3-V, preferably in a concentration of 5% or more to 40% or less, more preferably in a concentration of 6% or more to 30% or less.

xvii. The total concentration of the compounds selected from the group of formulae CC-3-VV, CC-3-VV1, CVC-3-V, CC-V-V, CC-V-V1, CC-1V-V1 and CC-2V-V2 in the mixture as a whole is 10% or more, preferably 15% or more, more preferably 20% or more and, most preferably, 25% or more.

xviii. The media comprise the compound of formula CC-V-V, preferably in a concentration of 5% or more to 60% or less, more preferably in a concentration of 10% or more to 25% or less.

xix. The media comprise the compound of formula CC-V-V1, preferably in a concentration of 5% or more to 60% or less, more preferably in a concentration of 10% or more to 25% or less.

xx. The media comprise the compound of formula CC-1V-V1, preferably in a concentration of 5% or more to 35% or less, more preferably in a concentration of 10% or more to 25% or less.

xxi. The media comprise the compound of formula CC-2V-V2, preferably in a concentration of 5% or more to 35% or less, more preferably in a concentration of 5% or more to 15% or less.

xxii. The media comprise the compound of formula CC-n-V, preferably CC-3-V, preferably in a concentration of 1% or more to 60% or less, more preferably in a concentration of 3% or more to 35% or less.

xxiii. The total concentration of the compounds of formula CC-3-V in the mixture as a whole preferably either is 15% or less, preferably 10% or less or 20% or more, preferably 25% or more.

xxiv. The total concentration of the compounds of formula Y-nO-Om in the mixture as a whole is 2% or more to 30% or less, preferably 5% or more to 15% or less.

xxv. The total concentration of the compounds of formula CY-n-Om in the mixture as a whole is 5% or more to 60% or less, preferably 15% or more to 45% or less.

xxvi. The total concentration of the compounds of formula CCY-n-Om and/or CCY-n-m, preferably of CCY-n-Om, in the mixture as a whole is 5% or more to 40% or less, preferably 1% or more to 25% or less.

xxvii. The total concentration of the compounds of formula CLY-n-Om in the mixture as a whole is 5% or more to 40% or less, preferably 10% or more to 30% or less.

xxviii. The liquid-crystalline medium essentially consists of compounds of the formulae I, II-1, II-2, III-1, III-2, IV and V, preferably of compounds of the formulae I, II-1, II-2, III-1 and III-2.

xxix. The liquid-crystalline medium comprises one or more compounds of formula IV, preferably of the formulae IV-1 and/or IV-2, preferably in a total concentration of 1% or more, in particular 2% or more, and very particularly preferably 3% or more to 50% or less, preferably 35% or less.

xxx. The liquid-crystalline medium comprises one or more compounds of formula V, preferably of the formulae V-1 and/or V-2, preferably in a total concentration of 1% or more, in particular 2% or more, and very particularly preferably 15% or more to 35% or less, preferably to 30% or less.

xxxi. The total concentration of the compounds of formula CCP-V-n, preferably CCP-V-1, in the mixture as a whole preferably is 5% or more to 30% or less, preferably 15% or more to 25% or less.

xxxii. The total concentration of the compounds of formula CCP-V2-n, preferably CCP-V2-1, in the mixture as a whole preferably is 1% or more to 15% or less, preferably 2% or more to 10% or less.

The invention furthermore relates to an electro-optical display having active-matrix addressing based on the VA, ECB, IPS, FFS or UB-FFS effect, characterised in that it contains, as dielectric, a liquid-crystalline medium in accordance with the present invention.

The liquid-crystal mixture preferably has a nematic phase range having a width of at least 70 degrees.

The liquid-crystal mixture according to the invention has a $\Delta\varepsilon$ of −0.5 to −8.0, in particular −1.5 to −6.0, and very particularly preferably −2.0 to −5.0, where $\Delta\varepsilon$ denotes the dielectric anisotropy.

The rotational viscosity $\gamma_1$ is preferably 120 mPa·s or less, in particular 100 mPa·s or less.

The mixtures according to the invention are suitable for all VA-TFT applications, such as, for example, VAN, MVA, (S)-PVA, ASV, PAVA and PSVA. They are furthermore suitable for IPS (in-plane switching), FFS (fringe-field switching) and PALC applications having negative $\Delta\varepsilon$.

The nematic liquid-crystal mixtures in the displays according to the invention generally comprise two components A and B, which themselves consist of one or more individual compounds.

The liquid-crystalline media according to the invention preferably comprise 4 to 15, in particular 5 to 12, and particularly preferably 10 or less, compounds. These are preferably selected from the group of the compounds of the formulae I, II-1, II-2, III-1 and III-2 and/or IV and/or V.

The liquid-crystalline media according to the invention may optionally also comprise more than 18 compounds. In this case, they preferably comprise 18 to 25 compounds.

In a preferred embodiment, the liquid-crystal media according to the invention comprise compounds selected from the group of the compounds of the formulae I, II, III, IV and V, preferably selected from the group of the compounds of the formulae I, II, III-1 and III-2; they preferably consist predominantly, particularly preferably essentially and very particularly preferably virtually completely of the compounds of the said formulae.

The liquid-crystal media according to the invention preferably have a nematic phase from in each case at least −20° C. or less to 70° C. or more, particularly preferably from −30° C. or less to 80° C. or more, very particularly preferably from −40° C. or less to 85° C. or more and most preferably from −40° C. or less to 90° C. or more.

The expression "have a nematic phase" here means on the one hand that no smectic phase and no crystallisation are observed at low temperatures at the corresponding temperature and on the other hand that no clearing occurs on heating out of the nematic phase. The investigation at low temperatures is carried out in a flow viscometer at the corresponding temperature and checked by storage in test cells having a cell thickness corresponding to the electro-optical application for at least 100 hours. If the storage stability at a temperature of −20° C. in a corresponding test cell is 1000 h or more, the medium is regarded as stable at this temperature. At temperatures of −30° C. and −40° C., the corresponding times are 500 h and 250 h respectively. At high temperatures, the clearing point is measured in capillaries by conventional methods.

In a preferred embodiment, the liquid-crystal media according to the invention are characterised by optical anisotropy values in the moderate to low range. The birefringence values are preferably in the range from 0.065 or more to 0.130 or less, particularly preferably in the range from 0.080 or more to 0.120 or less and very particularly preferably in the range from 0.085 or more to 0.110 or less.

In this embodiment, the liquid-crystal media according to the invention have negative dielectric anisotropy and relatively high absolute values of the dielectric anisotropy ($|\Delta\varepsilon|$) which are preferably in the range from 2.7 or more to 5.3 or less, preferably to 4.5 or less, preferably from 2.9 or more to 4.5 or less, particularly preferably from 3.0 or more to 4.0 or less and very particularly preferably from 3.5 or more to 3.9 or less.

The liquid-crystal media according to the invention have relatively low values for the threshold voltage ($V_0$) in the range from 1.7 V or more to 2.5 V or less, preferably from 1.8 V or more to 2.4 V or less, particularly preferably from 1.9 V or more to 2.35 V or less.

In a further preferred embodiment, the liquid-crystal media according to the invention preferably have relatively low values of the average dielectric anisotropy ($\varepsilon_{av.}\equiv(\varepsilon_\parallel+2\varepsilon_\perp)/3$) which are preferably in the range from 5.0 or more to 7.2 or less, preferably from 5.5 or more to 6.9 or less, still more preferably from 6.0 or more to 6.7 or less, particularly preferably from 5.6 or more to 6.1 or less and very particularly preferably from 6.1 or more to 6.5 or less.

In addition, the liquid-crystal media according to the invention have high values for the VHR in liquid-crystal cells.

In freshly filled cells at 20° C. in the cells, these are greater than or equal to 95%, preferably greater than or equal to 97%, particularly preferably greater than or equal to 98% and very particularly preferably greater than or equal to 99%, and after 5 minutes in the oven at 100° C. in the cells, these are greater than or equal to 90%, preferably greater than or equal to 93%, particularly preferably greater than or equal to 96% and very particularly preferably greater than or equal to 98%.

In general, liquid-crystal media having a low addressing voltage or threshold voltage here have a lower VHR than those having a higher addressing voltage or threshold voltage, and vice versa.

These preferred values for the individual physical properties are preferably also in each case maintained by the media according to the invention in combination with one another.

In the present application, the term "compounds", also written as "compound(s)", means both one and also a plurality of compounds, unless explicitly indicated otherwise.

In a preferred embodiment, the liquid-crystalline media according to the invention comprise
one or more compounds of formula I,
one or more compounds of formula II, preferably of the formulae Y-nO-Om and/or CY-n-Om, selected from the group of the compounds of the formulae Y-4O-O4, CY-3-O2, CY-3-O4, CY-5-O2 and CY-5-O4, optionally, preferably obligatorily, one or more compounds of formula III-1, preferably selected from the group of the compounds of the formulae CCY-n-m and CCY-n-Om, preferably of formula CCY-n-Om, preferably selected from the group of the compounds of the formulae CCY-3-O2, CCY-2-O2, CCY-3-O1, CCY-3-O3, CCY-4-O2, CCY-3-O2 and CCY-5-O2, optionally, preferably obligatorily, one or more compounds of formula III-2, preferably of formula CLY-n-Om, preferably selected from the group of the compounds of the formulae CLY-2-O4, CLY-3-O2, CLY-3-O3, optionally, preferably obligatorily, one or more compounds of formula IV, preferably selected from the group of the compounds of the formulae CC-n-V and CC-n-Vm, preferably CC-3-V, CC-3-V1, CC-4-V and CC-5-V, particularly preferably selected from the group of the compounds CC-3-V, CC-3-V1 and CC-4-V, very particularly preferably the compound CC-3-V, and optionally additionally the compound(s) CC-4-V and/or CC-3-V1, and optionally, preferably obligatorily, one or more compounds of formula V, preferably of the formulae CCP-V-1 and/or CCP-V2-1.

In a specific preferred embodiment of the present invention, the media according to the invention comprise one or more compounds of formula VI,

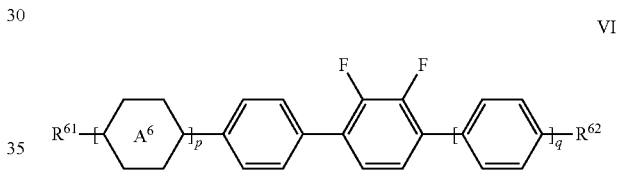

VI in which
$R^{61}$ and $R^{62}$ independently of one another have the meaning given for $R^{32}$ above,
$R^{61}$ preferably denotes an alkyl radical having 2 to 5 C atoms, preferably having 3 to 5 C atoms,
$R^{62}$ preferably denotes an alkyl or alkoxy radical having 2 to 5 C atoms, more preferably an alkoxy radical having 2 to 4 C atoms, or an alkenyloxy radical having 2 to 4 C atoms.

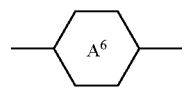

denotes

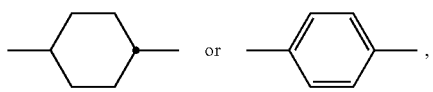

p and q independently of each other denote 0 or 1, and (p+q) preferably denotes 0 or 1.

These compounds are highly suitable as stabilisers in liquid-crystal mixtures, especially in case p=q=1 and ring $A^6$=1,4-phenylenbe. In particular, they stabilise the VHR of the mixtures against UV exposure.

In a preferred embodiment the media according to the invention comprise one or more compounds of formula VI selected from one or more formulae of the group of the compounds of the formulae VI-1 to VI-4, very particularly preferably of the formulae VI-1 to VI-3,

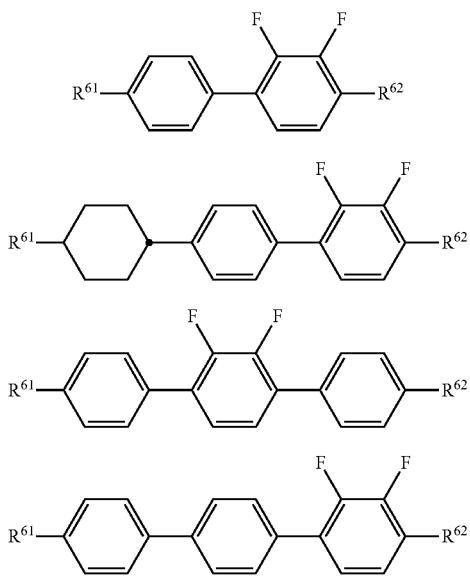

in which the parameters have the meanings given under formula VI.

In a further preferred embodiment, the medium comprises one or more compounds of formula VI-3, preferably of formula VI-3-a,

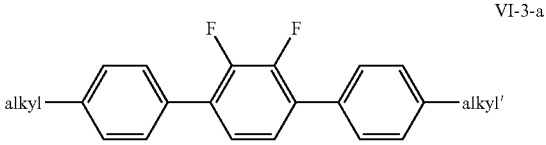

in which
alkyl and alkyl', independently of one another, denote alkyl having 1 to 7 C atoms, preferably having 2 to 5 C atoms.

In case the compounds of formula VI are used in the liquid crystalline media according to the present application, they are preferably present in a concentration of 20% or less, more preferably of 10% or less and, most preferably, of 5% or less and for the individual i.e. (homologous) compounds preferably in a concentration of 10% or less and, more preferably, of 5% or less.

For the present invention, the following definitions apply in connection with the specification of the constituents of the compositions, unless indicated otherwise in individual cases:

"comprise": the concentration of the constituents in question in the composition is preferably 5% or more, particularly preferably 10% or more, very particularly preferably 20% or more, "predominantly consist of": the concentration of the constituents in question in the composition is preferably 50% or more, particularly preferably 55% or more and very particularly preferably 60% or more, "essentially consist of": the concentration of the constituents in question in the composition is preferably 80% or more, particularly preferably 90% or more and very particularly preferably 95% or more, and "virtually completely consist of": the concentration of the constituents in question in the composition is preferably 98% or more, particularly preferably 99% or more and very particularly preferably 100.0%.

This applies both to the media as compositions with their constituents, which can be components and compounds, and also to the components with their constituents, the compounds. Only in relation to the concentration of an individual compound relative to the medium as a whole does the term comprise mean: the concentration of the compound in question is preferably 1% or more, particularly preferably 2% or more, very particularly preferably 4% or more.

For the present invention, "≤" means less than or equal to, preferably less than, and "≥" means greater than or equal to, preferably greater than.

For the present invention,

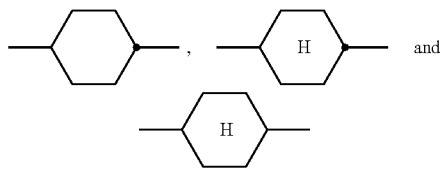

denote trans-1,4-cyclohexylene, and

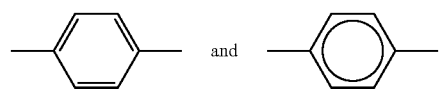

denote 1,4-phenylene.

For the present invention, the expression "dielectrically positive compounds" means compounds having a Δε of >1.5, the expression "dielectrically neutral compounds" means those where −1.5≤Δε≤1.5 and the expression "dielectrically negative compounds" means those where Δε<−1.5. The dielectric anisotropy of the compounds is determined here by dissolving 10% of the compounds in a liquid-crystalline host and determining the capacitance of the resultant mixture in each case in at least one test cell having a cell thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

The host mixture used for dielectrically positive and dielectrically neutral compounds is ZLI-4792 and that used for dielectrically negative compounds is ZLI-2857, both from Merck KGaA, Germany. The values for the respective compounds to be investigated are obtained from the change in the dielectric constant of the host mixture after addition of the compound to be investigated and extrapolation to 100% of the compound employed. The compound to be investigated is dissolved in the host mixture in an amount of 10%. If the solubility of the substance is too low for this purpose, the concentration is halved in steps until the investigation can be carried out at the desired temperature.

The liquid-crystal media according to the invention may, if necessary, also comprise further additives, such as, for example, stabilisers and/or pleochroitic, e.g. dichroitic, dyes and/or chiral dopants in the usual amounts. The amount of these additives employed is preferably in total 0% or more to 10% or less, based on the amount of the entire mixture, particularly preferably 0.1% or more to 6% or less. The concentration of the individual compounds employed is preferably 0.1% or more to 3% or less. The concentration of these and similar additives is generally not taken into account when specifying the concentrations and concentration ranges of the liquid-crystal compounds in the liquid-crystal media.

In a preferred embodiment, the liquid-crystal media according to the invention comprise a polymer precursor which comprises one or more reactive compounds, preferably reactive mesogens, and, if necessary, also further additives, such as, for example, polymerisation initiators and/or polymerisation moderators, in the usual amounts. The amount of these additives employed is in total 0% or more to 10% or less, based on the amount of the entire mixture, preferably 0.1% or more to 2% or less. The concentration of these and similar additives is not taken into account when specifying the concentrations and concentration ranges of the liquid-crystal compounds in the liquid-crystal media.

The compositions consist of a plurality of compounds, preferably 3 or more to 30 or fewer, particularly preferably 6 or more to 20 or fewer and very particularly preferably 10 or more to 16 or fewer compounds, which are mixed in a conventional manner. In general, the desired amount of the components used in lesser amount is dissolved in the components making up the principal constituent of the mixture. This is advantageously carried out at elevated temperature. If the selected temperature is above the clearing point of the principal constituent, completion of the dissolution operation is particularly easy to observe. However, it is also possible to prepare the liquid-crystal mixtures in other conventional ways, for example using pre-mixes or from a so-called "multi-bottle system".

The mixtures according to the invention exhibit very broad nematic phase ranges having clearing points of 65° C. or more, very favourable values for the capacitive threshold, relatively high values for the holding ratio and at the same time very good low-temperature stabilities at −30° C. and −40° C. Furthermore, the mixtures according to the invention are distinguished by low rotational viscosities $\gamma_1$.

It goes without saying to the person skilled in the art that the media according to the invention for use in VA, IPS, FFS or PALC displays may also comprise compounds in which, for example, H, N, O, Cl, F have been replaced by the corresponding isotopes.

The structure of the liquid-crystal displays according to the invention corresponds to the usual geometry, as described, for example, in EP-A 0 240 379.

The liquid-crystal phases according to the invention can be modified by means of suitable additives in such a way that they can be employed in any type of, for example, ECB, VAN, IPS, GH (Guest-Host) or ASM (axially symmetric microdomaoin)—VA LCD display that has been disclosed to date.

Table E below indicates possible dopants which can be added to the mixtures according to the invention. If the mixtures comprise one or more dopants, it is (they are) employed in amounts of 0.01% to 4%, preferably 0.1% to 1.0%.

Stabilisers which can be added, for example, to the mixtures according to the invention, preferably in amounts of 0.01% to 6%, in particular 0.1% to 3%, are shown below in Table F.

For the purposes of the present invention, all concentrations are, unless explicitly noted otherwise, indicated in percent by weight and relate to the corresponding mixture or mixture component, unless explicitly indicated otherwise.

All temperature values indicated in the present application, such as, for example, the melting point T(C,N), the smectic (S) to nematic (N) phase transition T(S,N) and the clearing point T(N,I), are indicated in degrees Celsius (° C.) and all temperature differences are correspondingly indicated in differential degrees (° or degrees), unless explicitly indicated otherwise.

For the present invention, the term "threshold voltage" relates to the capacitive threshold ($V_0$), also known as the Freedericks threshold, unless explicitly indicated otherwise.

All physical properties are and have been determined in accordance with "Merck Liquid Crystals, Physical Properties of Liquid Crystals", status November 1997, Merck KGaA, Germany, and apply for a temperature of 20° C., and $\Delta n$ is determined at 436 nm, 589 nm and at 633 nm, and $\Delta \varepsilon$ at 1 kHz, unless explicitly indicated otherwise in each case.

The electro-optical properties, for example the threshold voltage ($V_0$) (capacitive measurement), are, as is the switching behaviour, determined in test cells produced at Merck Japan. The measurement cells have soda-lime glass substrates and are constructed in an ECB or VA configuration with polyimide alignment layers (SE-1211 with diluent **26 (mixing ratio 1:1), both from Nissan Chemicals, Japan), which have been rubbed perpendicularly to one another and effect homeotropic alignment of the liquid crystals. The surface area of the transparent, virtually square ITO electrodes is 1 cm$^2$.

Unless indicated otherwise, a chiral dopant is not added to the liquid-crystal mixtures used, but the latter are also particularly suitable for applications in which doping of this type is necessary.

The rotational viscosity is determined using the rotating permanent magnet method and the flow viscosity in a modified Ubbelohde viscometer. For liquid-crystal mixtures ZLI-2293, ZLI-4792 and MLC-6608, all products from Merck KGaA, Darmstadt, Germany, the rotational viscosity values determined at 20° C. are 161 mPa·s, 133 mPa·s and 186 mPa·s respectively, and the flow viscosity values (ν) are 21 mm$^2$·s$^{-1}$, 14 mm$^2$·s$^{-1}$ and 27 mm$^2$·s$^{-1}$, respectively.

The dispersion of the materials may for practical purposes be conveniently characterized in the following way, which is used throughout this application unless explicitly stated otherwise. The values of the birefringence are determined at a temperature of 20° C. at several fixed wavelengths using a modified Abbé refractometer with homeotropically aligning surfaces on the sides of the prisms in contact with the material. The birefringence values are determined at the specific wavelength values of 436 nm (respective selected spectral line of a low pressure mercury lamp), 589 nm (sodium "D" line) and 633 nm (wavelength of a HE-Ne laser (used in combination with an attenuator/diffusor in rder to prevent damage to the eyes of the observers. In the following table $\Delta n$ is given at 589 nm and $\Delta(\Delta n)$ is given as $\Delta(\Delta n)=\Delta n(436\ nm)-\Delta n(633\ nm)$.

The following symbols are used, unless explicitly indicated otherwise:
$V_0$ threshold voltage, capacitive [V] at 20° C.,
$n_e$ extraordinary refractive index measured at 20° C. and 589 nm,
$n_o$ ordinary refractive index measured at 20° C. and 589 nm,
$\Delta n$ optical anisotropy measured at 20° C. and 589 nm,
$\lambda$ wavelength $\lambda$ [nm],
$\Delta n(\lambda)$ optical anisotropy measured at 20° C. and wavelength $\lambda$, Δ(Δn) change in optical anisotropy defined as:
Δn(20° C., 436 nm)–Δn(20° C., 633 nm),
Δ(Δn*) "relative change in optical anisotropy" defined as:
Δ(Δn)/Δn(20° C.,589 nm),
$\varepsilon_\perp$ dielectric susceptibility perpendicular to the director at 20° C. and 1 kHz,
$\varepsilon_\parallel$ dielectric susceptibility parallel to the director at 20° C. and 1 kHz,
Δε dielectric anisotropy at 20° C. and 1 kHz,
T(N,I) or cl.p.clearing point [° C.],
ν flow viscosity measured at 20° C. [mm$^2 \cdot$s$^{-1}$],
$\gamma_1$ rotational viscosity measured at 20° C. [mPa·s],
$k_{11}$ elastic constant, "splay" deformation at 20° C. [pN],
$k_{22}$ elastic constant, "twist" deformation at 20° C. [pN],
$k_{33}$ elastic constant, "bend" deformation at 20° C. [pN],
LTS low-temperature stability of the phase, determined in test cells,
VHR voltage holding ratio,
ΔVHR decrease in the voltage holding ratio, and
$S_{rel}$ relative stability of the VHR, The following examples explain the present invention without limiting it. However, they show the person skilled in the art preferred mixture concepts with compounds preferably to be employed and the respective concentrations thereof and combinations thereof with one another. In addition, the examples illustrate the properties and property combinations that are accessible.

For the present invention and in the following examples, the structures of the liquid-crystal compounds are indicated by means of acronyms, with the transformation into chemical formulae taking place in accordance with Tables A to C below. All radicals $C_nH_{2n+1}$, $C_mH_{2m+1}$ and $C_lH_{2l+1}$ or $C_nH_{2n}$, $C_mH_{2m}$ and $C_lH_{2l}$ are straight-chain alkyl radicals or alkylene radicals, in each case having n, m and l C atoms respectively. Preferably n, m and l are independently of each other 1, 2, 3, 4, 5, 6, or 7. Table A shows the codes for the ring elements of the nuclei of the compound, Table B lists the bridging units, and Table C lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

| Ring elements | |
|---|---|
| C | (cyclohexane ring) |
| D | (dioxane ring) |
| A | (tetrahydropyran ring) |
| P | (phenyl ring) |

TABLE A-continued

| Ring elements | |
|---|---|
| G | (fluorophenyl ring) |
| U | (difluorophenyl ring) |
| Y | (difluorophenyl ring) |
| P(F,Cl)Y | (fluoro-chloro-phenyl ring) |
| np | (naphthalene) |
| n3f | (trifluoronaphthalene) |
| th | (tetrahydronaphthalene) |
| DI | (dioxane ring) |
| AI | (tetrahydropyran ring) |
| GI | (fluorophenyl ring) |
| UI | (difluorophenyl ring) |

TABLE A-continued

| Ring elements | |
|---|---|
| P(Cl,F)Y | 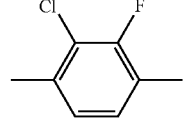 |
| nN3fl | 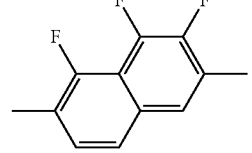 |
| thl | |
| tH2f | |
| o2f | |
| dh | |
| K | |
| L | |

TABLE A-continued

| Ring elements | |
|---|---|
| F | |
| tH2fl | |
| o2fl | |
| KI | |
| LI | |
| FI | |

TABLE B

| | Bridging units | | |
|---|---|---|---|
| E | —CH$_2$—CH$_2$— | | |
| V | —CH=CH— | | |
| T | —C≡C— | | |
| W | —CF$_2$—CF$_2$— | | |
| B | —CF=CF— | | |
| Z | —CO—O— | ZI | —O—CO— |
| X | —CF=CH— | XI | —CH=CF— |
| O | —CH$_2$—O— | OI | —O—CH$_2$— |
| Q | —CF$_2$—O— | QI | —O—CF$_2$— |

TABLE C

| End groups | | | |
|---|---|---|---|
| On the left individually or in combination | | On the right individually or in combination | |
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | -F |

TABLE C-continued

| End groups | | | |
|---|---|---|---|
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |

| On the left only in combination | | On the right only in combination | |
|---|---|---|---|
| -...n...- | —C$_n$H$_{2n}$— | -...n... | —C$_n$H$_{2n}$— |
| -...M...- | —CFH— | -...M... | —CFH— |
| -...D...- | —CF$_2$— | -...D... | —CF$_2$— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m are each integers, and the three dots "..." are placeholders for other abbreviations from this table.

Besides the compounds of formula I, the mixtures according to the invention preferably comprise one or more compounds of the compounds mentioned below.

The following abbreviations are used:
(n, m and l are, independently of one another, each an integer, preferably 1 to 6, l possibly also 0 and preferably 0 or 2)

TABLE D

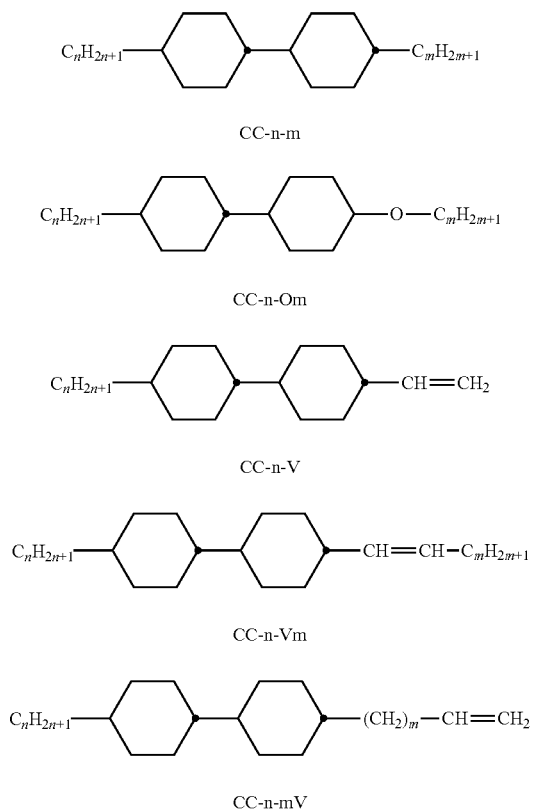

CC-n-m

CC-n-Om

CC-n-V

CC-n-Vm

CC-n-mV

TABLE D-continued
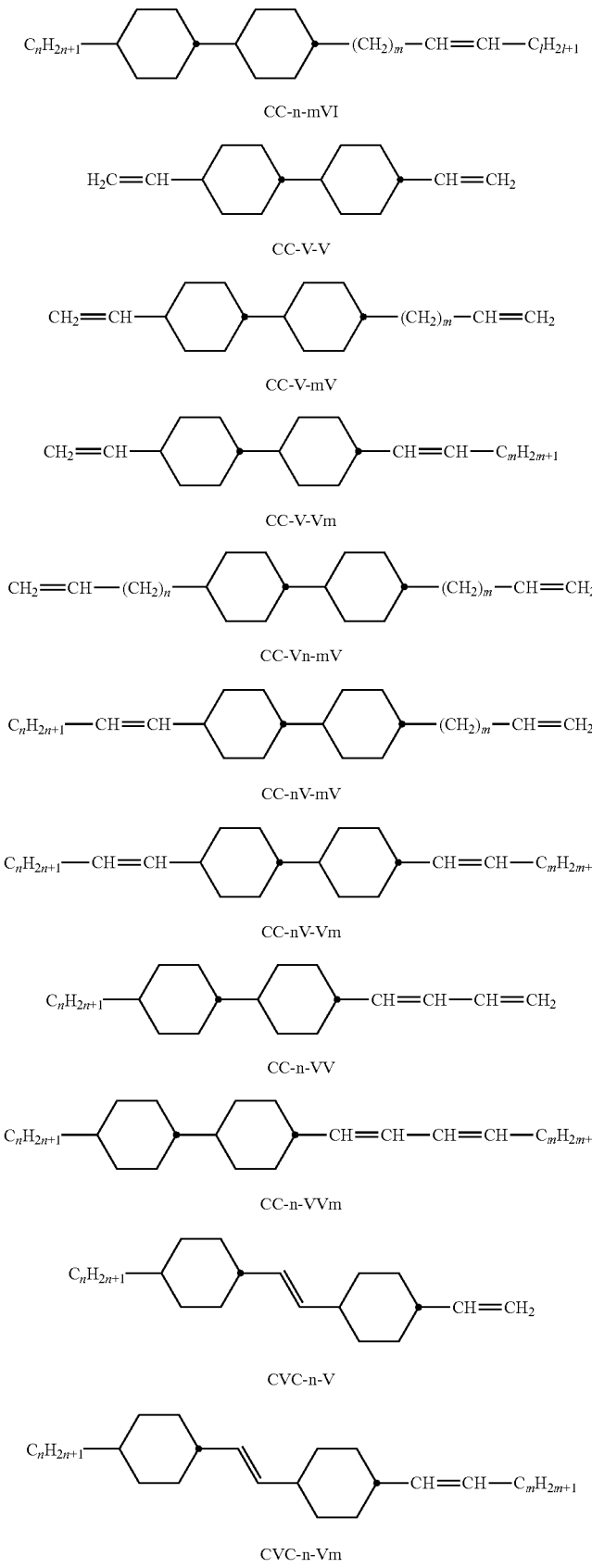

TABLE D-continued
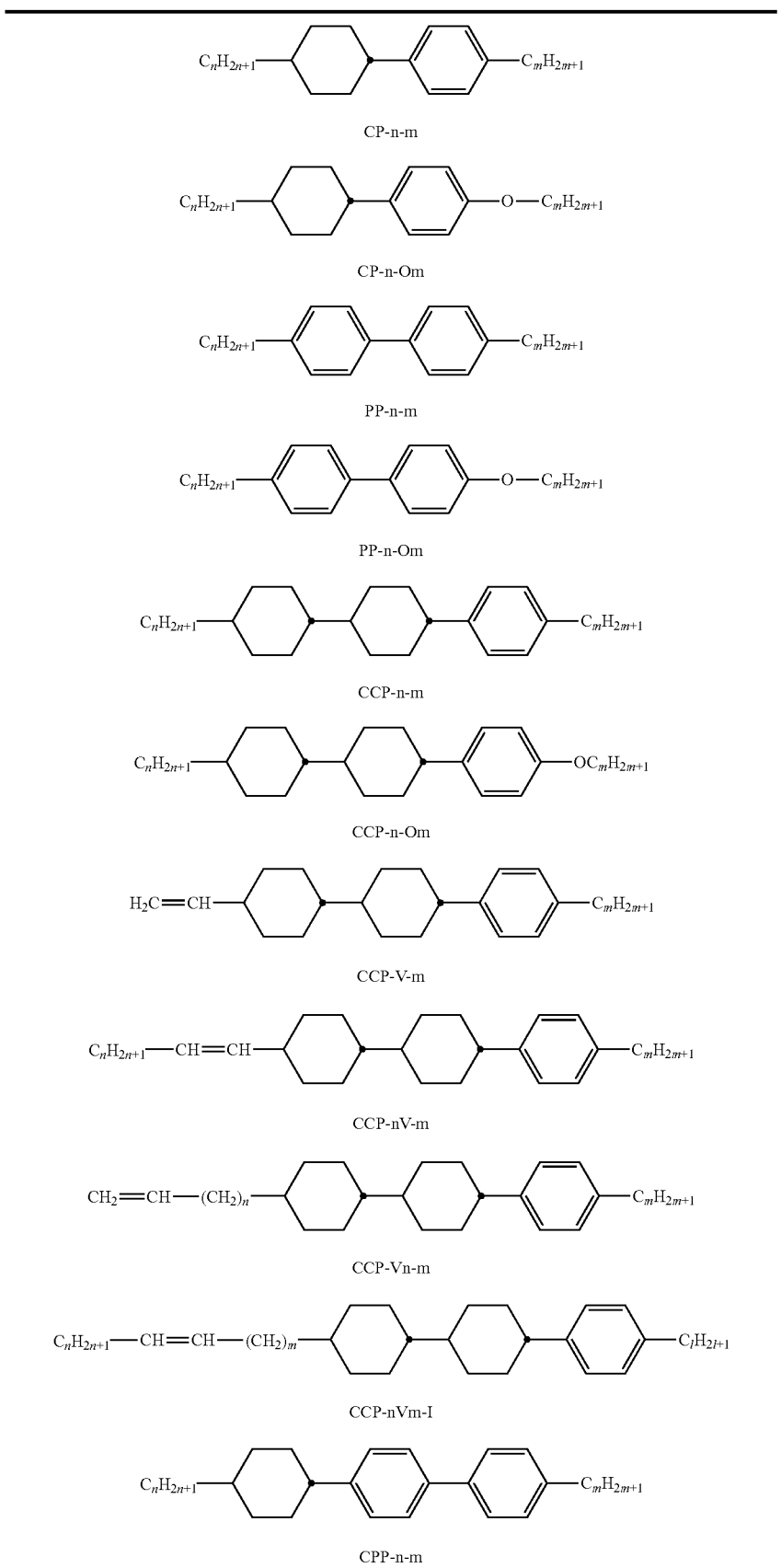

TABLE D-continued
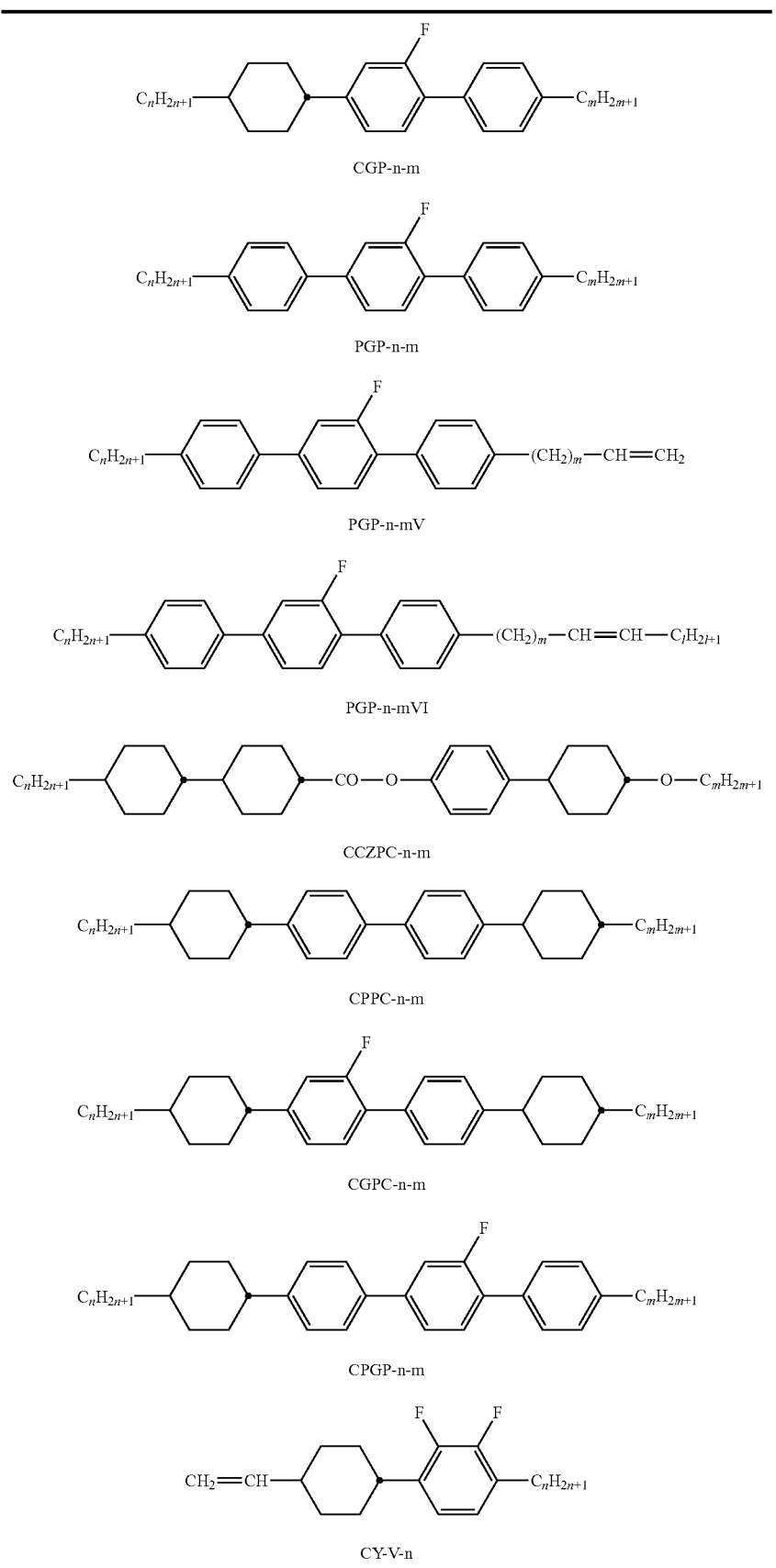

TABLE D-continued
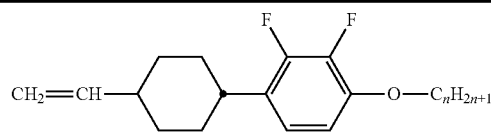
CY-V-On
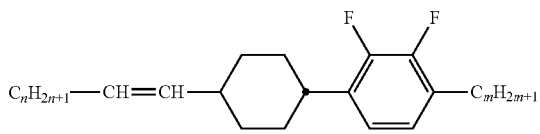
CY-nV-m
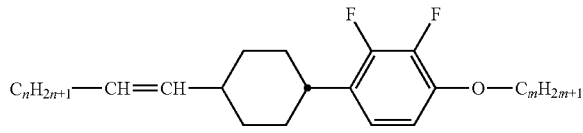
CY-nV-Om
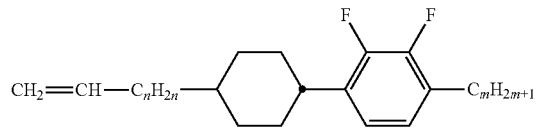
CY-Vn-m
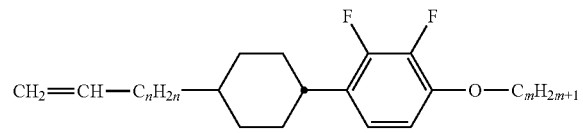
CY-Vn-Om
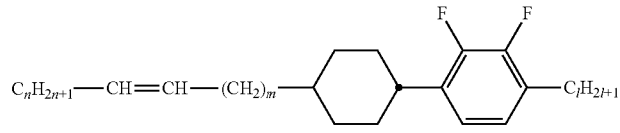
CY-nVm-l
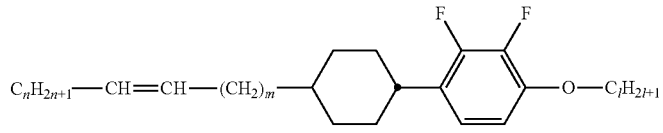
CY-nVm-Ol
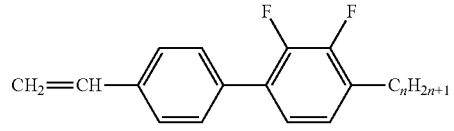
PY-V-n
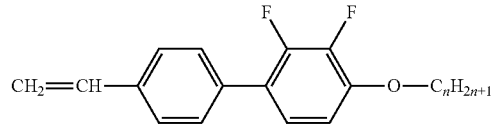
PY-V-On TABLE D-continued
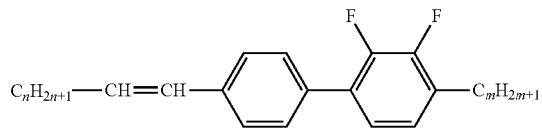
PY-nV-m
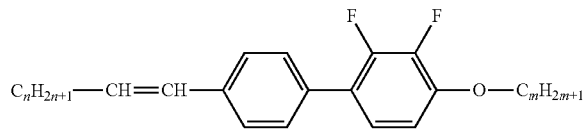
PY-nV-Om
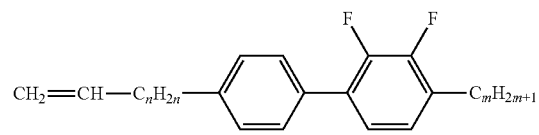
PY-Vn-m
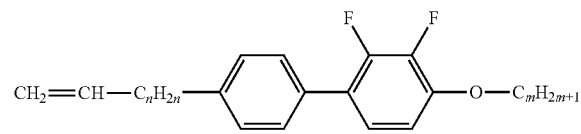
PY-Vn-Om
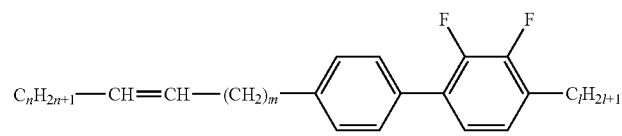
PY-nVm-l
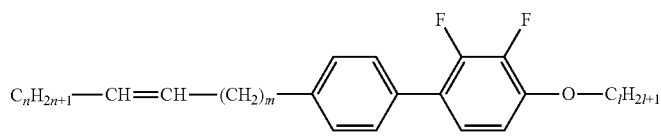
PY-nVm-Ol
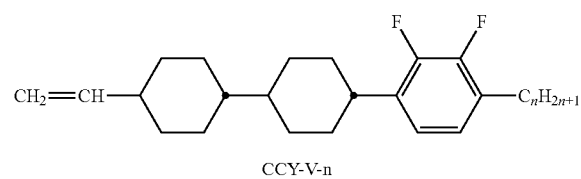
CCY-V-n
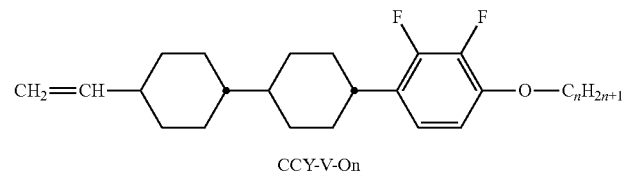
CCY-V-On
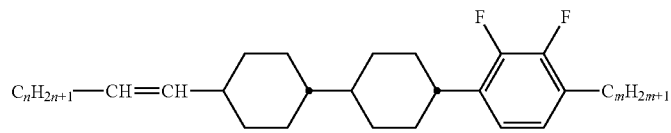
CCY-nV-m TABLE D-continued
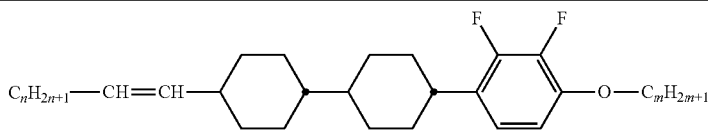
CCCY-nV-Om
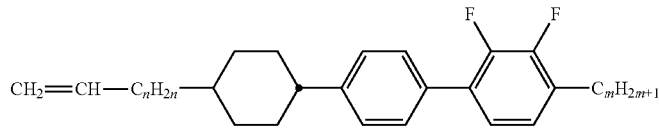
CCY-Vn-m
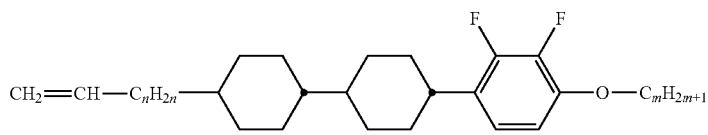
CCY-Vn-Om
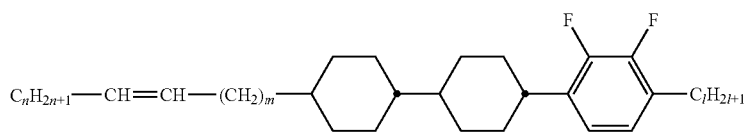
CCY-nVm-I
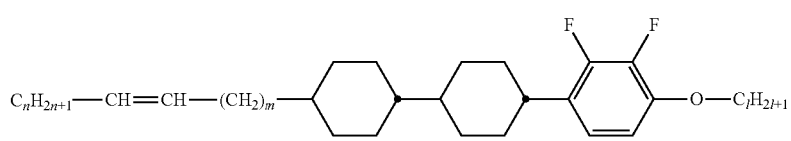
CCY-nVm-OI
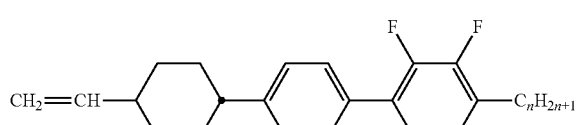
CPY-V-n
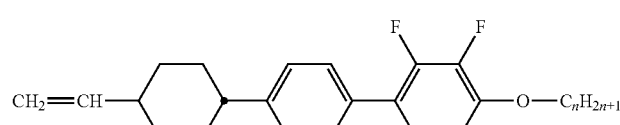
CPY-V-On
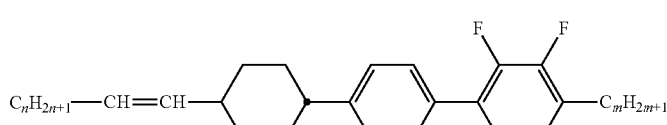
CPY-nV-m
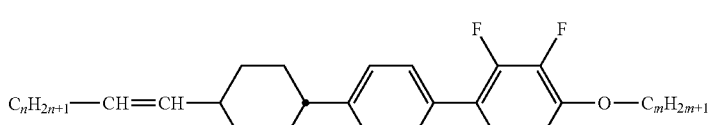
CPY-nV-Om TABLE D-continued
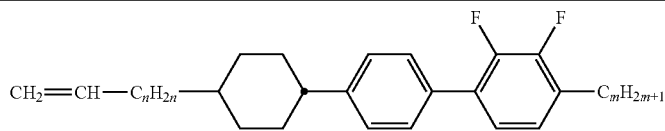
CPY-Vn-m
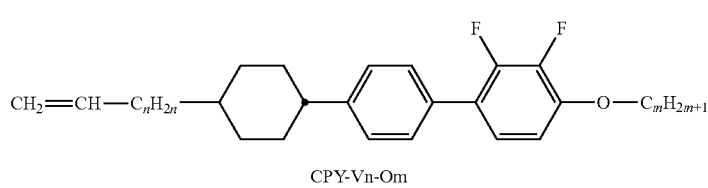
CPY-Vn-Om
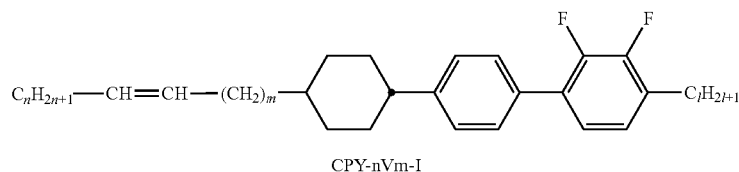
CPY-nVm-l
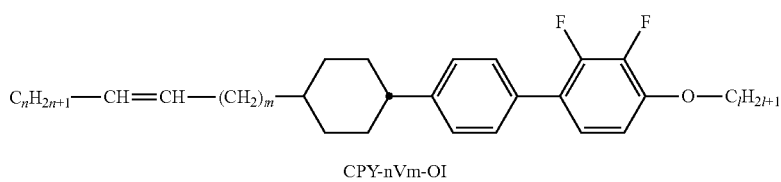
CPY-nVm-Ol
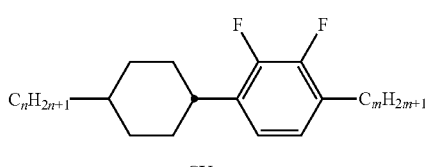
CY-n-m
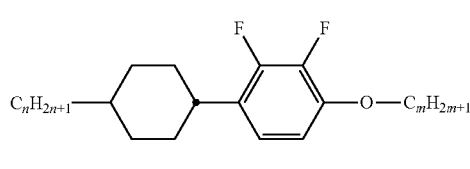
CY-n-Om
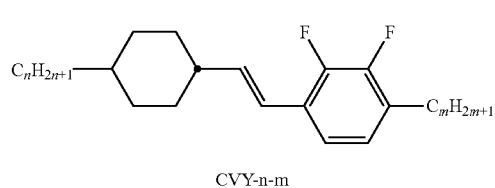
CVY-n-m
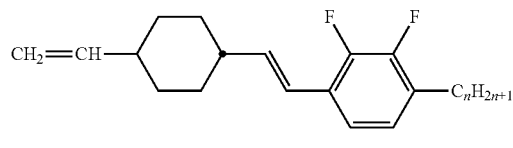
CVY-V-n
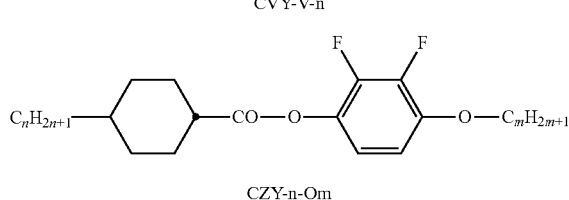
CZY-n-Om TABLE D-continued
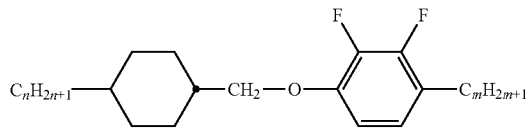
COY-n-m
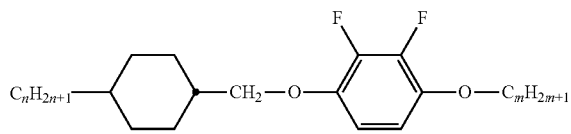
COY-n-Om
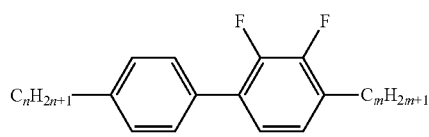
PY-n-m
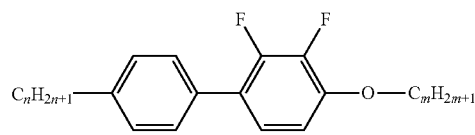
PY-n-Om
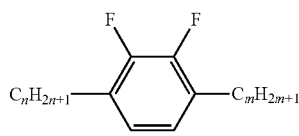
Y-n-m
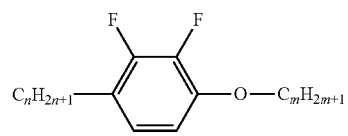
Y-n-Om
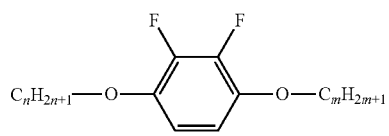
Y-nO-Om
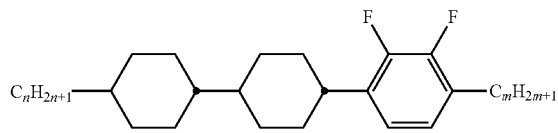
CCY-n-m
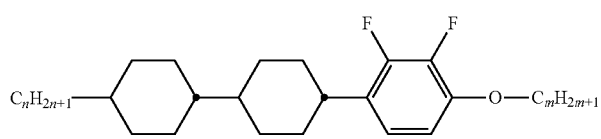
CCY-n-Om TABLE D-continued
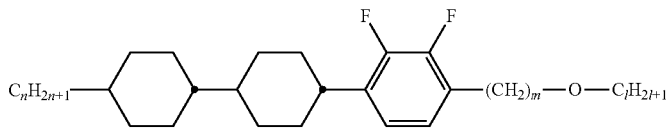
CCY-n-mOI
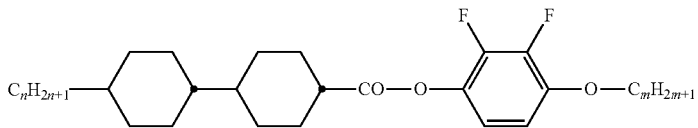
CCZY-n-Om
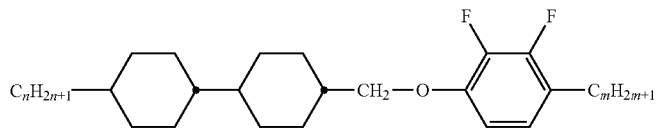
CCOY-n-m
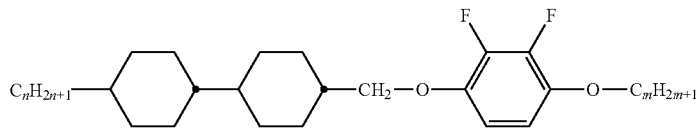
CCOY-n-Om
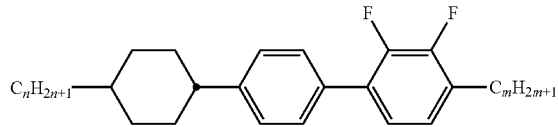
CPY-n-m
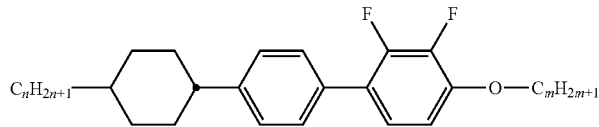
CPY-n-Om
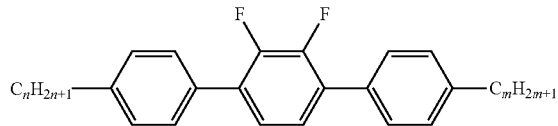
PYP-n-m
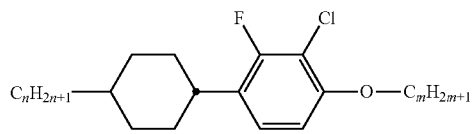
CP(F,Cl)-n-Om
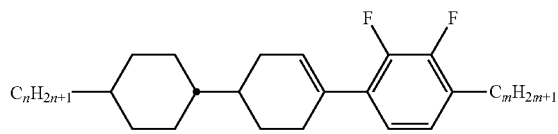
CLY-n-m TABLE D-continued
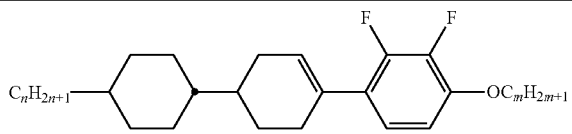
CLY-n-Om
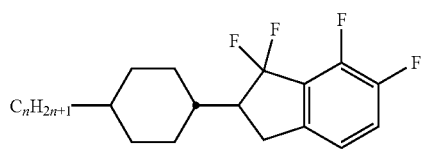
CK-n-F
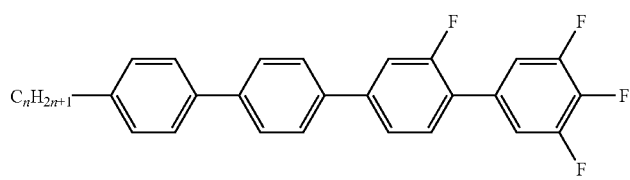
PPGU-n-F
Table E shows chiral dopants which are preferably employed in the mixtures according to the invention.
TABLE E
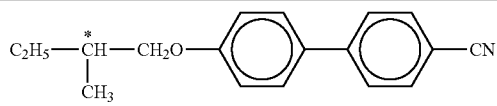
C 15
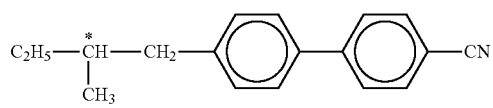
CB 15
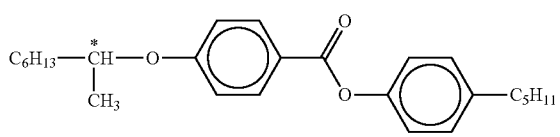
CM 21
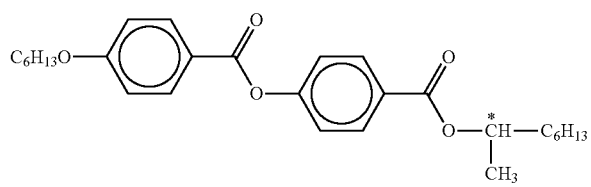
R S-811/S-811
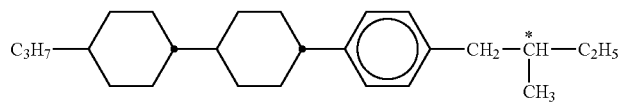
CM 44

TABLE E-continued
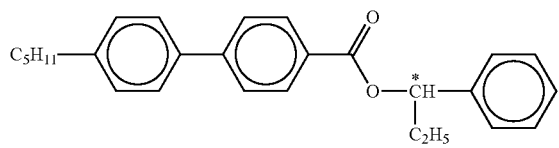
CM 45
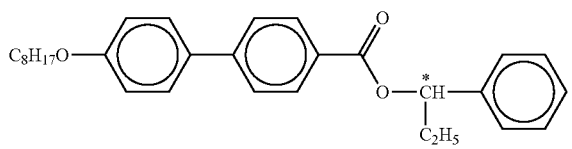
CM 47
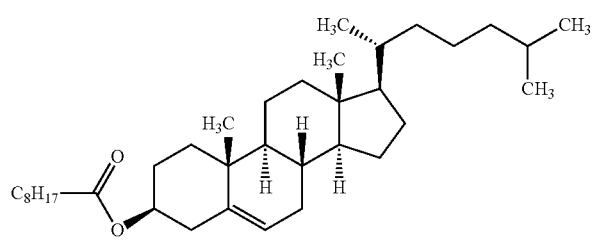
CN
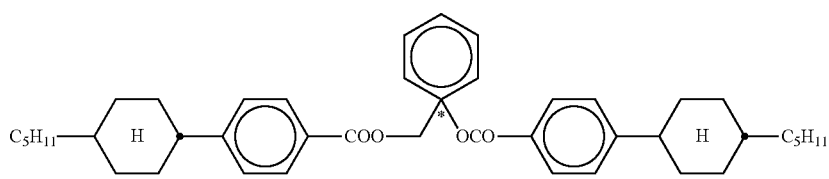
R-1011/S-1011
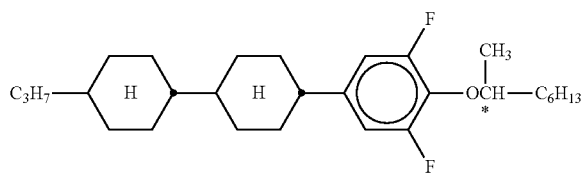
R-2011/S-2011
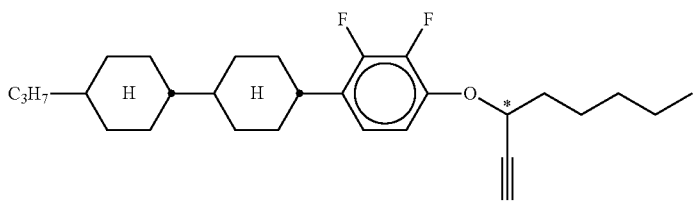
R-3011/S-3011
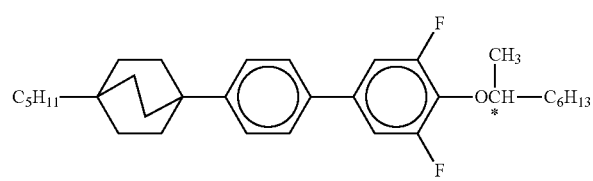
R-4011/S-4011

TABLE E-continued

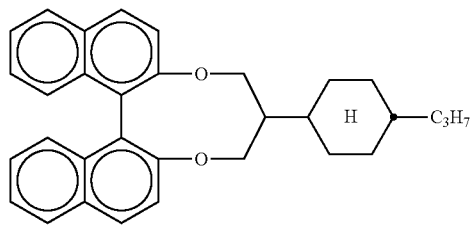

R-5011/S-5011

In a preferred embodiment of the present invention, the media according to the invention comprise one or more compounds selected from the group of the compounds from Table E.

Table F shows stabilisers which can preferably be employed in the mixtures according to the invention in addition to the compounds of formula I. The parameter n here denotes an integer in the range from 1 to 12. In particular, the phenol derivatives shown can be employed as additional stabilisers since they act as antioxidants.

TABLE F

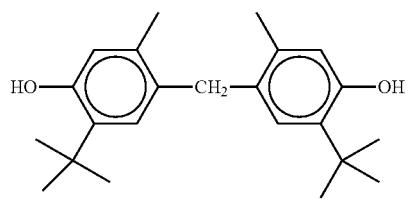

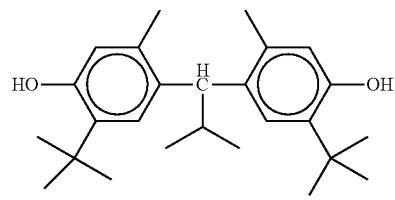

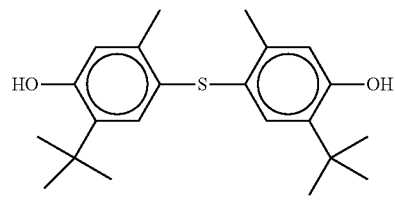

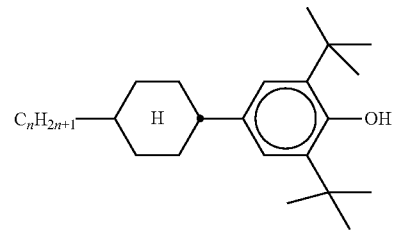

TABLE F-continued
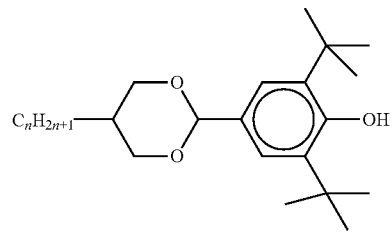
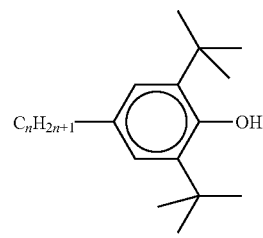
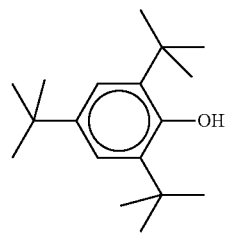
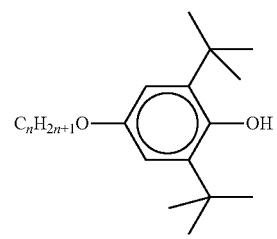
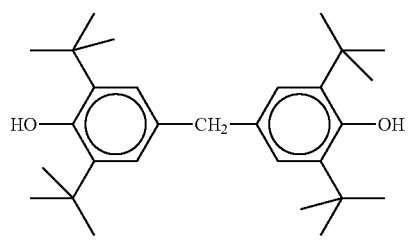
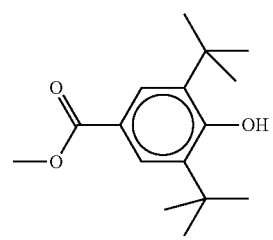

TABLE F-continued
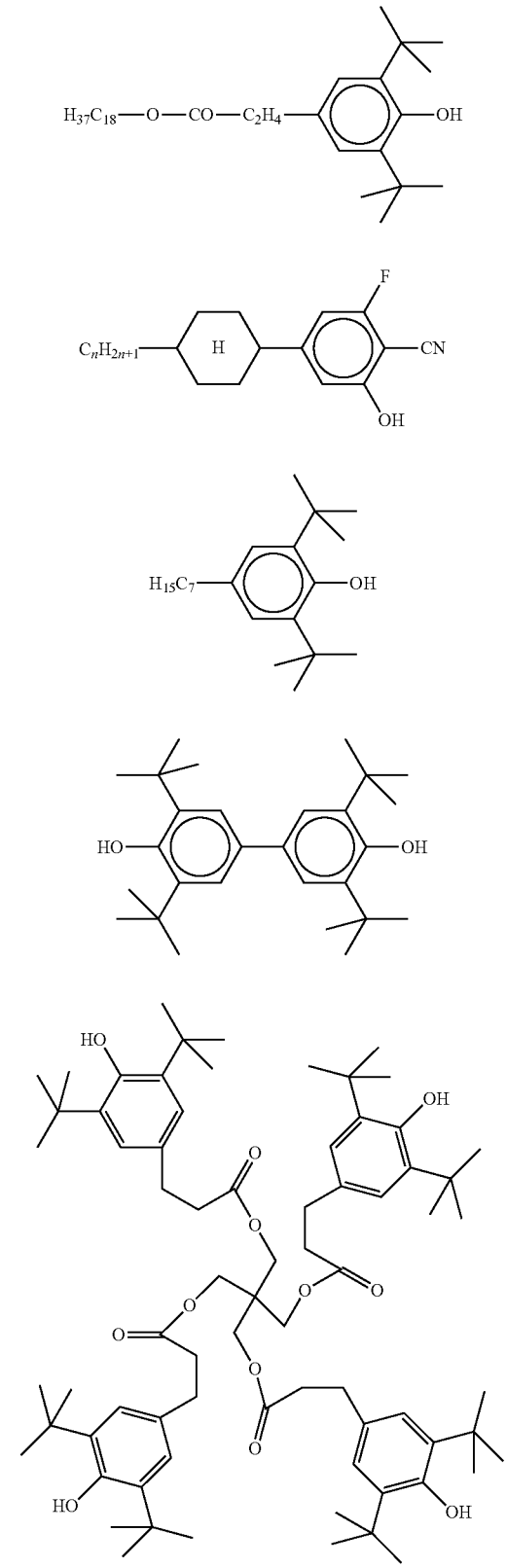

TABLE F-continued
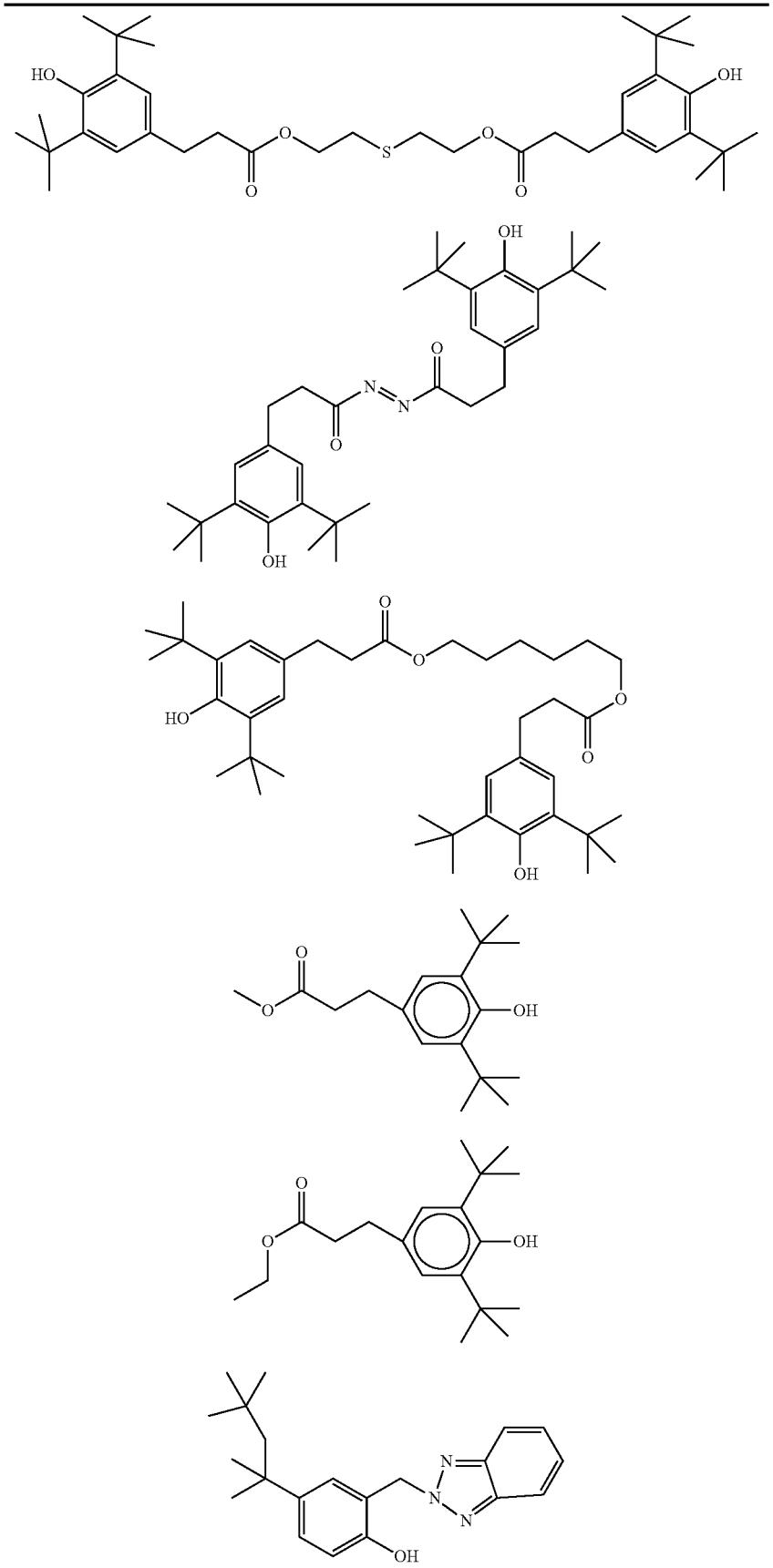

TABLE F-continued
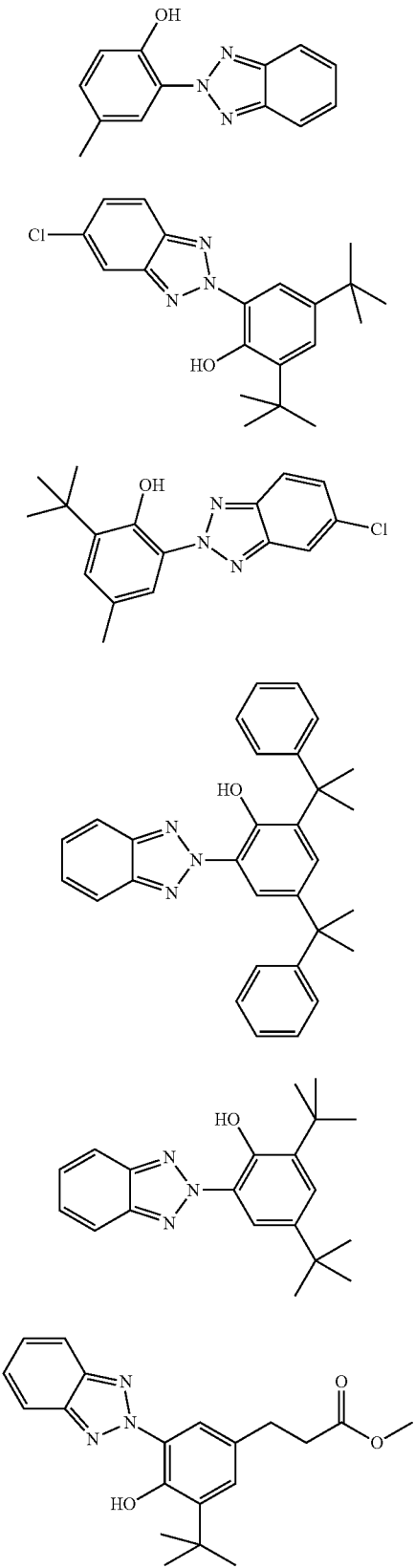

TABLE F-continued
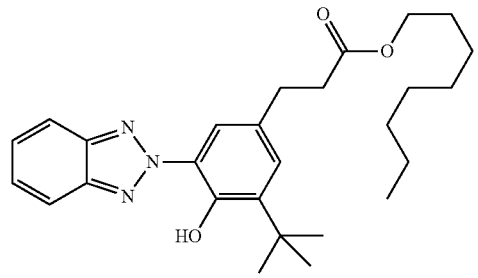 [SMILES: CCCCCCCCOC(=O)CCc1cc(-n2nc3ccccc3n2)c(O)c(C(C)(C)C)c1]
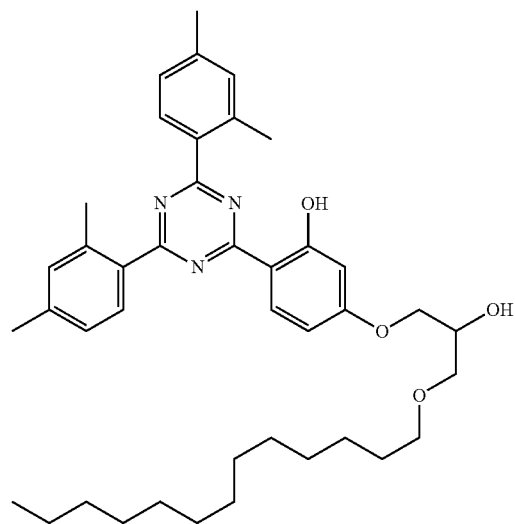 [SMILES: CCCCCCCCCCCCCOCC(O)COc1ccc(-c2nc(-c3ccc(C)cc3C)nc(-c3ccc(C)cc3C)n2)c(O)c1]
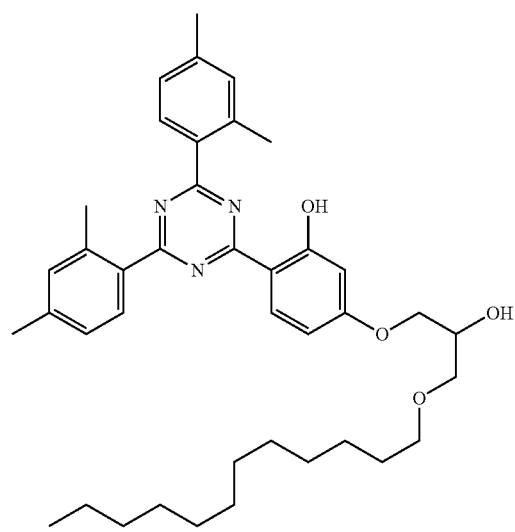 [SMILES: CCCCCCCCCCCCOCC(O)COc1ccc(-c2nc(-c3ccc(C)cc3C)nc(-c3ccc(C)cc3C)n2)c(O)c1]

TABLE F-continued
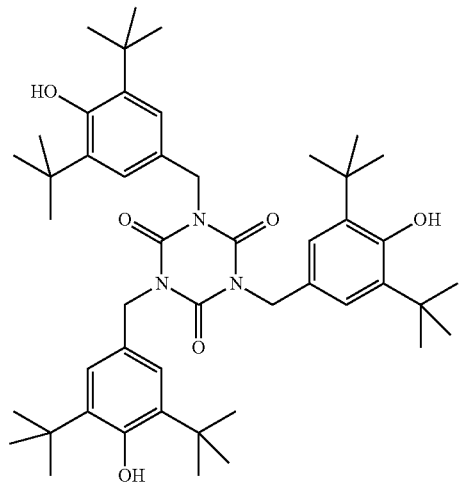 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
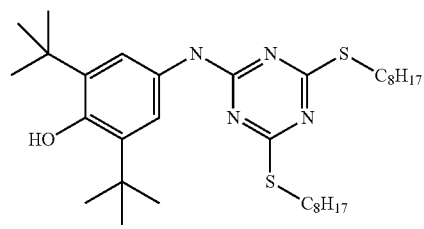
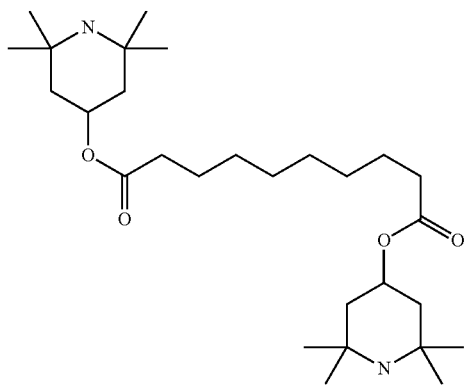
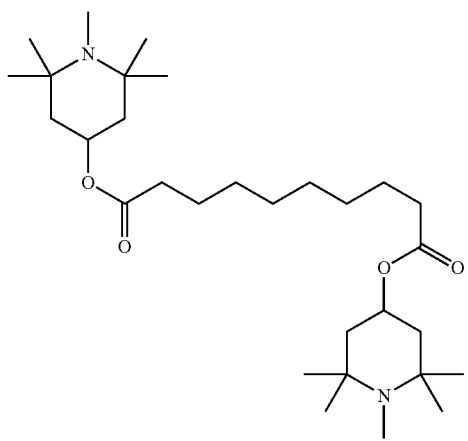

TABLE F-continued
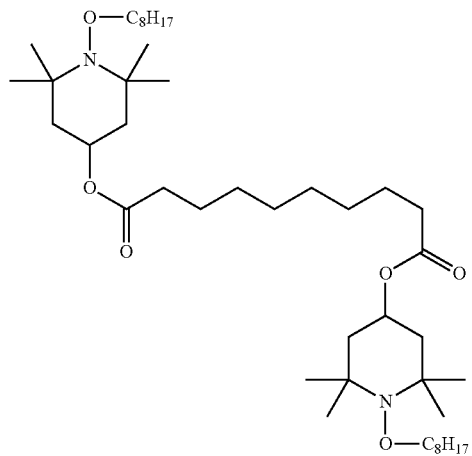
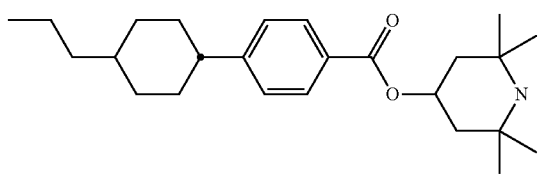
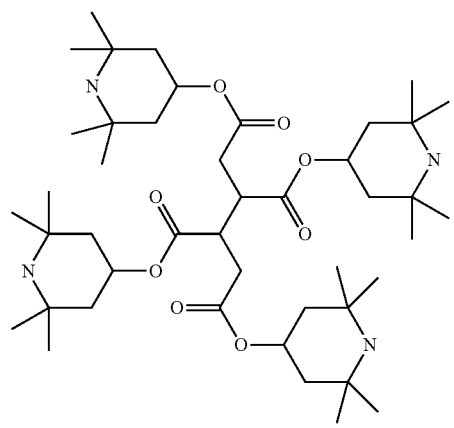
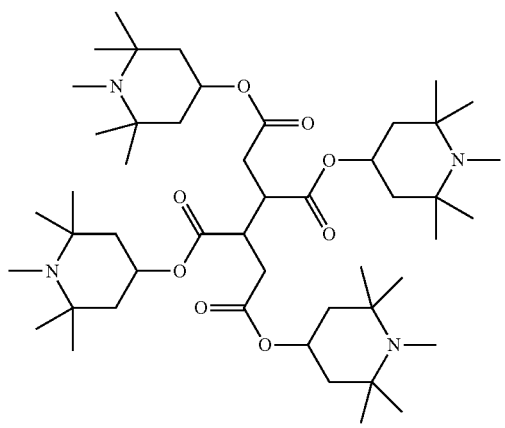

In a preferred embodiment of the present invention, the media according to the invention comprise one or more compounds selected from the group of the compounds from Table F, in particular one or more compounds selected from the group of the compounds of the following four formulae

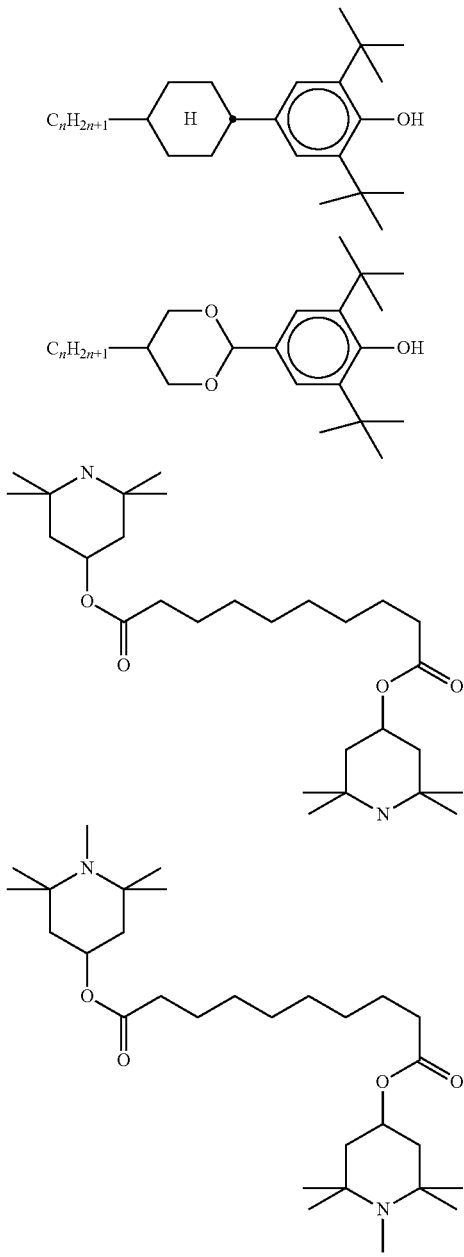

EXAMPLES

The following examples explain the present invention without restricting it in any way. However, the physical properties make it clear to the person skilled in the art what properties can be achieved and in what ranges they can be modified. In particular, the combination of the various properties which can preferably be achieved is thus well defined for the person skilled in the art.

Comparative Example 1

The following mixture (C-1) is prepared and investigated.

| Mixture C-1 | | |
|---|---|---|
| Composition | | |
| Compound | | Concentration /% |
| No. | Abbreviation | by weight |
| 1 | CY-3-O2 | 21.0 |
| 2 | CY-5-O2 | 4.5 |
| 3 | CCY-3-O1 | 11.5 |
| 4 | CCY-3-O2 | 7.5 |
| 5 | CLY-3-O2 | 4.5 |
| 6 | CLY-3-O3 | 3.0 |
| 7 | CPY-2-O2 | 4.5 |
| 8 | CPY-3-O2 | 4.5 |
| 9 | PYP-2-4 | 4.5 |
| 10 | CC-3-V | 33.5 |
| 11 | CCP-V-1 | 1.0 |
| Σ | | 100.0 |
| Physical properties | | |
| T (N, I) = 74.0° C. $n_e$ (20° C., 589 nm) = 1.5736 $\Delta n$ (20° C., 589 nm) = 0.0931 $\varepsilon_\perp$ (20°, 1 kHz) = 7.5 $\Delta\varepsilon$ (20°, 1 kHz) = −3.8 $\gamma_1$ (20° C.) = 93 mPa·s $k_{11}$ (20° C.) = 12.5 pN $k_{33}$ (20° C.) = 14.9 pN $V_0$ (20° C.) = 2.08 V | | |

Mixture C-1 is characterized by a relatively large wavelength dispersion of the birefringence, which is $\Delta(\Delta n)=\Delta n(20°\ C., 436\ nm)-\Delta n(20°\ C., 633\ nm)=0.0112$, and thus rather high. Here the accuracy of the value of $\Delta(\Delta n)$ has to be taken as about +/−0.0004, i.e. double the value of the individual $\Delta n$-values.

Example 1

The following mixture (M-1) is prepared and investigated.

| Mixture M-1 | | |
|---|---|---|
| Composition | | |
| Compound | | Concentration /% |
| No. | Abbreviation | by weight |
| 1 | CY-3-O2 | 25.0 |
| 2 | CY-5-O2 | 19.0 |
| 3 | CCY-3-O2 | 4.0 |
| 4 | CLY-3-O2 | 5.0 |
| 5 | CLY-3-O3 | 7.0 |
| 6 | CC-V-V1 | 14.0 |
| 7 | CCP-V-1 | 18.0 |
| 8 | CCP-V2-1 | 8.0 |
| Σ | | 100.0 |
| Physical properties | | |
| T (N, I) = 74.0° C. $n_e$ (20° C., 589 nm) = 1.5777 $\Delta n$ (20° C., 589 nm) = 0.0939 $\varepsilon_\perp$ (20°, 1 kHz) = 7.5 | | |

Mixture M-1

$\Delta\varepsilon$ (20°, 1 kHz) = −3.8
$\gamma_1$ (20° C.) = 115 mPa·s
$k_{11}$ (20° C.) = 12.8 pN
$k_{33}$ (20° C.) = 16.4 pN
$V_0$ (20° C.) = 2.19 V Mixture M-1 is characterized by a comparatively small wavelength dispersion of the birefringence, which is only $\Delta(\Delta n)=\Delta n(20°\,C., 436\,nm)-\Delta n(20°\,C., 633\,nm)=0.0092$.

Example 2

The following mixture (M-2) is prepared and investigated.

Mixture M-2

Composition

| No. | Compound Abbreviation | Concentration /% by weight |
|---|---|---|
| 1 | CY-3-O2 | 24.0 |
| 2 | CY-5-O2 | 18.0 |
| 3 | CCY-3-O2 | 4.0 |
| 4 | CLY-3-O2 | 7.5 |
| 5 | CLY-3-O3 | 7.0 |
| 6 | CC-1V-V1 | 10.0 |
| 7 | CC-3-V | 9.5 |
| 8 | CCP-V-1 | 20.0 |
| Σ | | 100.0 |

Physical properties

T (N, I) = 74.0° C.
$n_e$ (20° C., 589 nm) = 1.5750
$\Delta n$ (20° C., 589 nm) = 0.0932
$\varepsilon_\perp$ (20°, 1 kHz) = 7.5
$\Delta\varepsilon$ (20°, 1 kHz) = −3.9
$\gamma_1$ (20° C.) = 111 mPa·s
$k_{11}$ (20° C.) = 13.3 pN
$k_{33}$ (20° C.) = 17.2 pN
$V_0$ (20° C.) = 2.23 V Mixture M-2 is characterized by a rather small wavelength dispersion of the birefringence, which is only $\Delta(\Delta n)=0.0086$.

Example 3

The following mixture (M-3) is prepared and investigated.

Mixture M-3

Composition

| No. | Compound Abbreviation | Concentration /% by weight |
|---|---|---|
| 1 | CY-3-O2 | 24.0 |
| 2 | CY-5-O2 | 18.0 |
| 3 | CCY-3-O2 | 4.0 |
| 4 | CLY-3-O3 | 9.0 |
| 5 | CLY-3-O2 | 5.0 |
| 6 | CC-2V-V2 | 10.0 |
| 7 | CC-3-V | 8.0 |
| 8 | CCP-V-1 | 18.0 |
| 9 | CCP-V2-1 | 4.0 |
| Σ | | 100.0 |

Physical properties

T (N, I) = 74.0° C.
$n_e$ (20° C., 589 nm) = 1.5741
$\Delta n$ (20° C., 589 nm) = 0.0918
$\varepsilon_\perp$ (20°, 1 kHz) = 7.5
$\Delta\varepsilon$ (20°, 1 kHz) = −3.8
$\gamma_1$ (20° C.) = 111 mPa·s
$k_{11}$ (20° C.) = 12.9 pN
$k_{33}$ (20° C.) = 15.5 pN
$V_0$ (20° C.) = 2.14 V Mixture M-3 is characterized by a very small wavelength dispersion of the birefringence, which is even only $\Delta(\Delta n)=0.0082$.

Example 4

The following mixture (M-4) is prepared and investigated.

Mixture M-4

Composition

| No. | Compound Abbreviation | Concentration /% by weight |
|---|---|---|
| 1 | CY-3-O2 | 24.0 |
| 2 | CY-5-O2 | 18.0 |
| 3 | CCY-3-O1 | 5.0 |
| 4 | CCY-3-O2 | 8.0 |
| 5 | CCY-3-O3 | 8.0 |
| 6 | CC-3-VV | 25.0 |
| 7 | CC-3-V | 5.0 |
| 8 | CCP-V-1 | 7.0 |
| Σ | | 100.0 |

Physical properties

T (N, I) = 74.0° C.
$n_e$ (20° C., 589 nm) = 1.5706
$\Delta n$ (20° C., 589 nm) = 0.0921
$\varepsilon_\perp$ (20°, 1 kHz) = 7.6
$\Delta\varepsilon$ (20°, 1 kHz) = −3.8
$\gamma_1$ (20° C.) = 106 mPa·s
$k_{11}$ (20° C.) = 12.6 pN
$k_{33}$ (20° C.) = 16.3 pN
$V_0$ (20° C.) = 2.19 V Mixture M-4 is characterized by a rather small wavelength dispersion of the birefringence, which is only $\Delta(\Delta n)=0.0087$.

Example 5

The following mixture (M-5) is prepared and investigated.

| Mixture M-5 | | |
|---|---|---|
| Composition | | |
| Compound | | Concentration /% |
| No. | Abbreviation | by weight |
| 1 | CY-3-O2 | 22.0 |
| 2 | CY-5-O2 | 18.0 |
| 3 | CCY-3-O2 | 12.0 |
| 4 | CLY-3-O3 | 12.0 |
| 5 | CC-3-VV | 27.0 |
| 6 | CC-3-V | 9.0 |
| Σ | | 100.0 |
| Physical properties | | |

T (N, I) = 74.0° C.
$n_e$ (20° C., 589 nm) = 1.5700
Δn (20° C., 589 nm) = 0.0927
$\varepsilon_\perp$ (20°, 1 kHz) = 7.7
Δε (20°, 1 kHz) = −3.9
$\gamma_1$ (20° C.) = 102 mPa · s
$k_{11}$ (20° C.) = 13.0 pN
$k_{33}$ (20° C.) = 16.0 pN
$V_0$ (20° C.) = 2.15 V Mixture M-5 is characterized by a relatively small wavelength dispersion of the birefringence, which is only Δ(Δn)=0.0094.

Example 6

The following mixture (M-6) is prepared and investigated.

| Mixture M-6 | | |
|---|---|---|
| Composition | | |
| Compound | | Concentration /% |
| No. | Abbreviation | by weight |
| 1 | CY-3-O2 | 24.0 |
| 2 | CY-5-O2 | 18.0 |
| 3 | CCY-3-O1 | 5.0 |
| 4 | CLY-3-O2 | 6.0 |
| 5 | CLY-3-O3 | 6.0 |
| 6 | CVC-3-V | 14.0 |
| 7 | CCP-V-1 | 22.0 |
| 8 | CCP-V2-1 | 5.0 |
| Σ | | 100.0 |
| Physical properties | | |

T (N, I) = 75.0° C.
$n_e$ (20° C., 589 nm) = 1.5760
Δn (20° C., 589 nm) = 0.0924
$\varepsilon_\perp$ (20°, 1 kHz) = 7.4
Δε (20°, 1 kHz) = −3.7
$\gamma_1$ (20° C.) = 118 mPa · s
$k_{11}$ (20° C.) = 12.2 pN
$k_{33}$ (20° C.) = 15.6 pN
$V_0$ (20° C.) = 2.18 V Mixture M-6 is characterized by a very small wavelength dispersion of the birefringence, which is only Δ(Δn)=0.0083.

Example 7

The following mixture (M-7) is prepared and investigated.

| Mixture M-7 | | |
|---|---|---|
| Composition | | |
| Compound | | Concentration/ |
| No. | Abbreviation | % by weight |
| 1 | CY-3-O2 | 18.0 |
| 2 | CY-5-O2 | 17.0 |
| 3 | CCY-3-O1 | 4.0 |
| 4 | CLY-3-O2 | 12.0 |
| 5 | CLY-3-O3 | 7.0 |
| 6 | PY-3-O2 | 2.0 |
| 7 | CC-V-V1 | 23.0 |
| 8 | CCP-V-1 | 17.0 |
| Σ | | 100.0 |
| Physical properties | | |

T (N, I) = 75.0° C.
$n_e$ (20° C., 589 nm) = 1.5789
Δn (20° C., 589 nm) = 0.0955
$\varepsilon_\perp$ (20°, 1 kHz) = 7.4
Δε (20°, 1 kHz) = −3.8
$\gamma_1$ (20° C.) = 108 mPa · s
$k_{11}$ (20° C.) = 12.9 pN
$k_{33}$ (20° C.) = 16.4 pN
$V_0$ (20° C.) = 2.26 V Mixture M-7 is characterized by a rather small wavelength dispersion of the birefringence, which is only Δ(Δn)=0.0090.

Example 8

The following mixture (M-8) is prepared and investigated.

| Mixture M-8 | | |
|---|---|---|
| Composition | | |
| Compound | | Concentration/ |
| No. | Abbreviation | % by weight |
| 1 | CY-3-O2 | 20.0 |
| 2 | CY-5-O2 | 17.0 |
| 3 | CCY-3-O1 | 4.0 |
| 4 | CLY-3-O2 | 20.0 |
| 5 | CLY-3-O3 | 6.0 |
| 6 | CC-V-V1 | 14.0 |
| 7 | CCP-V-1 | 17.0 |
| Σ | | 100.0 |
| Physical properties | | |

T (N, I) = 78.5° C.
$n_e$ (20° C., 589 nm) = 1.5786
Δn (20° C., 589 nm) = 0.0957
$\varepsilon_\perp$ (20°, 1 kHz) = 7.7
Δε (20°, 1 kHz) = −4.0
$\gamma_1$ (20° C.) = 116 mPa · s
$k_{11}$ (20° C.) = 13.6 pN -continued

| Mixture M-8 |
|---|
| $k_{33}$ (20° C.) = 17.7 pN |
| $V_0$ (20° C.) = 2.22 V |

Mixture M-8 is characterized by a rather small wavelength dispersion of the birefringence, which is only $\Delta(\Delta n)=0.0089$.

Example 9

The following mixture (M-9) is prepared and investigated.

| Mixture M-9 | | |
|---|---|---|
| Composition | | |
| Compound | | Concentration/ |
| No. | Abbreviation | % by weight |
| 1 | CY-3-O2 | 24.0 |
| 2 | CY-3-O4 | 4.0 |
| 3 | CY-5-O2 | 12.0 |
| 4 | CCY-3-O1 | 6.0 |
| 5 | CLY-3-O2 | 9.0 |
| 6 | CLY-3-O3 | 7.0 |
| 7 | PY-3-O2 | 1.0 |
| 8 | CC-1V-V1 | 8.0 |
| 9 | CC-3-V | 10.0 |
| 10 | CCP-V-1 | 19.0 |
| Σ | | 100.0 |
| Physical properties | | |
| T (N, I) = 74.5° C. | | |
| $n_e$ (20° C., 589 nm) = 1.5767 | | |
| $\Delta n$ (20° C., 589 nm) = 0.0942 | | |
| $\varepsilon_\perp$ (20°, 1 kHz) = 7.8 | | |
| $\Delta\varepsilon$ (20°, 1 kHz) = −4.1 | | |
| $\gamma_1$ (20° C.) = 120 mPa · s | | |
| $k_{11}$ (20° C.) = 13.1 pN | | |
| $k_{33}$ (20° C.) = 16.8 pN | | |
| $V_0$ (20° C.) = 2.14 V | | |

Mixture M-9 is characterized by a rather small wavelength dispersion of the birefringence, which is only $\Delta(\Delta n)=0.0089$.

Example 10

The following mixture (M-10) is prepared and investigated.

| Mixture M-10 | | |
|---|---|---|
| Composition | | |
| Compound | | Concentration/ |
| No. | Abbreviation | % by weight |
| 1 | CY-3-O2 | 10.0 |
| 2 | CY-3-O4 | 8.0 |
| 3 | CY-5-O2 | 8.0 |
| 4 | CLY-2-O4 | 10.0 |
| 5 | CLY-3-O2 | 10.0 |
| 6 | CLY-3-O3 | 10.0 |
| 7 | PY-3-O2 | 3.0 |

-continued

| Mixture M-10 | | |
|---|---|---|
| 8 | CC-1V-V1 | 21.0 |
| 9 | CC-3-V | 20.0 |
| Σ | | 100.0 |
| Physical properties | | |
| T (N, I) = 74.0° C. | | |
| $n_e$ (20° C., 589 nm) = 1.5695 | | |
| $\Delta n$ (20° C., 589 nm) = 0.0913 | | |
| $\varepsilon_\perp$ (20°, 1 kHz) = 7.0 | | |
| $\Delta\varepsilon$ (20°, 1 kHz) = −3.6 | | |
| $\gamma_1$ (20° C.) = 97 mPa · s | | |
| $k_{11}$ (20° C.) = 14.3 pN | | |
| $k_{33}$ (20° C.) = 17.3 pN | | |
| $V_0$ (20° C.) = 2.32 V | | |

Mixture M-10 is characterized by a rather small wavelength dispersion of the birefringence, which is only $\Delta(\Delta n)=0.0085$.

Example 11

The following mixture (M-11) is prepared and investigated.

| Mixture M-11 | | |
|---|---|---|
| Composition | | |
| Compound | | Concentration/ |
| No. | Abbreviation | % by weight |
| 1 | CY-3-O2 | 20.0 |
| 2 | CY-5-O2 | 18.0 |
| 3 | CCY-3-O2 | 2.0 |
| 4 | CLY-3-O2 | 9.0 |
| 5 | CLY-3-O3 | 5.0 |
| 6 | CC-2V-V2 | 12.0 |
| 7 | CC-3-V | 4.0 |
| 8 | CCP-V-1 | 18.0 |
| 9 | CCP-V2-1 | 6.0 |
| Σ | | 100.0 |
| Physical properties | | |
| T (N, I) = 74.0° C. | | |
| $n_e$ (20° C., 589 nm) = 1.5755 | | |
| $\Delta n$ (20° C., 589 nm) = 0.0928 | | |
| $\varepsilon_\perp$ (20°, 1 kHz) = 7.7 | | |
| $\Delta\varepsilon$ (20°, 1 kHz) = −3.8 | | |
| $\gamma_1$ (20° C.) = 113 mPa · s | | |
| $k_{11}$ (20° C.) = 12.9 pN | | |
| $k_{33}$ (20° C.) = 15.4 pN | | |
| $V_0$ (20° C.) = 2.13 V | | |

Mixture M-11 is characterized by a rather small wavelength dispersion of the birefringence, which is only $\Delta(\Delta n)=0.0085$.

Example 12

The following mixture (M-12) is prepared and investigated.

| Mixture M-12 | | |
|---|---|---|
| Composition | | |
| Compound | | Concentration/ |
| No. | Abbreviation | % by weight |
| 1 | CY-3-O2 | 27.0 |
| 2 | CY-5-O2 | 13.0 |
| 3 | CLY-3-O2 | 15.0 |
| 4 | CLY-3-O3 | 8.0 |
| 5 | CC-3-VV | 18.0 |
| 6 | CC-3-V | 10.0 |
| 7 | CCP-V-1 | 95.0 |
| Σ | | 100.0 |
| Physical properties | | |

T (N, I) = 76.0° C.
$n_e$ (20° C., 589 nm) = 1.5766
Δn (20° C., 589 nm) = 0.0962
$\varepsilon_\perp$ (20°, 1 kHz) = 7.8
Δε (20°, 1 kHz) = −4.0
$\gamma_1$ (20° C.) = 106 mPa · s
$k_{11}$ (20° C.) = 13.3 pN
$k_{33}$ (20° C.) = 16.4 pN
$V_0$ (20° C.) = 2.14 V Mixture M-12 is characterized by a relatively small wavelength dispersion of the birefringence, which is Δ(Δn)=0.0106.

Example 13

The following mixture (M-13) is prepared and investigated.

| Mixture M-13 | | |
|---|---|---|
| Composition | | |
| Compound | | Concentration/ |
| No. | Abbreviation | % by weight |
| 1 | CY-3-O2 | 20.0 |
| 2 | CY-5-O2 | 18.0 |
| 3 | CCY-3-O2 | 5.0 |
| 4 | CLY-3-O2 | 9.0 |
| 5 | CLY-3-O3 | 5.0 |
| 6 | PY-3-O2 | 3.0 |
| 7 | CC-3-VV | 17.0 |
| 7 | CC-3-V | 11.0 |
| 8 | CCP-V-1 | 8.0 |
| Σ | | 100.0 |
| Physical properties | | |

T (N, I) = 74.0° C.
$n_e$ (20° C., 589 nm) = 1.5757
Δn (20° C., 589 nm) = 0.0960
$\varepsilon_\perp$ (20°, 1 kHz) = 7.8
Δε (20°, 1 kHz) = −4.0
$\gamma_1$ (20° C.) = 109 mPa · s
$k_{11}$ (20° C.) = 13.2 pN
$k_{33}$ (20° C.) = 15.8 pN
$V_0$ (20° C.) = 2.13 V Mixture M-13 is characterized by a relatively small wavelength dispersion of the birefringence, which is Δ(Δn)=0.0103.

Example 14

The following mixture (M-14) is prepared and investigated.

| Mixture M-14 | | |
|---|---|---|
| Composition | | |
| Compound | | Concentration/ |
| No. | Abbreviation | % by weight |
| 1 | CY-3-O2 | 20.0 |
| 2 | CY-5-O2 | 18.0 |
| 3 | CCY-3-O3 | 5.0 |
| 4 | CCY-5-O2 | 4.0 |
| 5 | CLY-3-O2 | 9.0 |
| 6 | CLY-3-O3 | 5.0 |
| 7 | PY-3-O2 | 3.0 |
| 8 | CC-3-VV | 17.0 |
| 9 | CC-3-V | 11.0 |
| 10 | CCP-V-1 | 8.0 |
| Σ | | 100.0 |
| Physical properties | | |

T (N, I) = 73.5° C.
$n_e$ (20° C., 589 nm) = 1.5750
Δn (20° C., 589 nm) = 0.0924
$\varepsilon_\perp$ (20°, 1 kHz) = 7.4
Δε (20°, 1 kHz) = −4.0
$\gamma_1$ (20° C.) = 108 mPa · s
$k_{11}$ (20° C.) = 13.0 pN
$k_{33}$ (20° C.) = 15.8 pN
$V_0$ (20° C.) = 2.11 V Mixture M-14 is characterized by a comparatively small wavelength dispersion of the birefringence, which is only Δ(Δn)=0.0097.

Example 15

The following mixture (M-15) is prepared and investigated.

| Mixture M-15 | | |
|---|---|---|
| Composition | | |
| Compound | | Concentration/ |
| No. | Abbreviation | % by weight |
| 1 | CY-3-O2 | 19.0 |
| 2 | CY-5-O2 | 20.0 |
| 3 | CLY-3-O2 | 14.0 |
| 4 | CLY-3-O3 | 12.0 |
| 5 | CC-3-VV | 24.0 |
| 6 | CC-3-V | 11.0 |
| Σ | | 100.0 |
| Physical properties | | |

T (N, I) = 75.5° C.
$n_e$ (20° C., 589 nm) = 1.5736
Δn (20° C., 589 nm) = 0.0956
$\varepsilon_\perp$ (20°, 1 kHz) = 7.8
Δε (20°, 1 kHz) = −4.0

-continued

| Mixture M-15 |
|---|
| $\gamma_1$ (20° C.) = 104 mPa · s |
| $k_{11}$ (20° C.) = 13.6 pN |
| $k_{33}$ (20° C.) = 16.2 pN |
| $V_0$ (20° C.) = 2.11 V |

Mixture M-15 is characterized by a comparatively small wavelength dispersion of the birefringence, which is only $\Delta(\Delta n)$=0.0098.

Example 16

The following mixture (M-16) is prepared and investigated.

| Mixture M-16 | | |
|---|---|---|
| Composition | | |
| Compound | | Concentration/ |
| No. | Abbreviation | % by weight |
| 1 | CY-3-O2 | 17.5 |
| 2 | CCY-3-O1 | &.0 |
| 3 | CCY-3-O2 | 10.0 |
| 4 | CCY-5-O2 | 5.0 |
| 5 | CLY-3-O2 | 6.0 |
| 6 | CLY-3-O3 | 6.5 |
| 7 | Y-4O-O4V | 12.0 |
| 8 | CC-3-VV | 35.0 |
| 9 | CC-3-V | 3.0 |
| Σ | | 100.0 |
| Physical properties | | |
| T (N, I) = 75.5° C. | | |
| $n_e$ (20° C., 589 nm) = 1.5718 | | |
| $\Delta n$ (20° C., 589 nm) = 0.0943 | | |
| $\varepsilon_\perp$ (20°, 1 kHz) = 8.2 | | |
| $\Delta\varepsilon$ (20°, 1 kHz) = −4.1 | | |
| $\gamma_1$ (20° C.) = 94 mPa · s | | |
| $k_{11}$ (20° C.) = 12.9 pN | | |
| $k_{33}$ (20° C.) = 16.0 pN | | |
| $V_0$ (20° C.) = 2.10 V | | |

Mixture M-16 is characterized by a relatively small wavelength dispersion of the birefringence, which is $\Delta(\Delta n)$=0.0105.

Example 17

The following mixture (M-17) is prepared and investigated.

| Mixture M-17 | | |
|---|---|---|
| Composition | | |
| Compound | | Concentration/ |
| No. | Abbreviation | % by weight |
| 1 | CY-3-O2 | 9.0 |
| 2 | CCY-2-O2 | 10.0 |
| 3 | CCY-3-O1 | 14.0 |
| 4 | CLY-3-O2 | 14.0 |
| 5 | PY-1-O4 | 5.0 |
| 6 | PY-3-O2 | 5.0 |
| 7 | PY-4-O2 | 5.0 |
| 8 | CC-3-VV | 7.0 |
| 9 | CC-3-V | 31.0 |
| Σ | | 100.0 |
| Physical properties | | |
| T (N, I) = 77.5° C. | | |
| $n_e$ (20° C., 589 nm) = 1.5773 | | |
| $\Delta n$ (20° C., 589 nm) = 0.0957 | | |
| $\varepsilon_\perp$ (20°, 1 kHz) = 7.4 | | |
| $\Delta\varepsilon$ (20°, 1 kHz) = −3.7 | | |
| $\gamma_1$ (20° C.) = 97 mPa · s | | |
| $k_{11}$ (20° C.) = 13.7 pN | | |
| $k_{33}$ (20° C.) = 15.6 pN | | |
| $V_0$ (20° C.) = 2.16 V | | |

Example 18

The following mixture (M-18) is prepared and investigated.

| Mixture M-18 | | |
|---|---|---|
| Composition | | |
| Compound | | Concentration/ |
| No. | Abbreviation | % by weight |
| 1 | CY-3-O2 | 22.0 |
| 2 | CY-5-O2 | 15.0 |
| 3 | CLY-3-O2 | 14.0 |
| 4 | CLY-3-O3 | 5.0 |
| 5 | CC-3-VV | 31.0 |
| 6 | CC-3-V | 13.0 |
| Σ | | 100.0 |
| Physical properties | | |
| T (N, I) = 72.5° C. | | |
| $n_e$ (20° C., 589 nm) = 1.5700 | | |
| $\Delta n$ (20° C., 589 nm) = 0.0927 | | |
| $\varepsilon_\perp$ (20°, 1 kHz) = 6.9 | | |
| $\Delta\varepsilon$ (20°, 1 kHz) = −3.2 | | |
| $\gamma_1$ (20° C.) = 84 mPa · s | | |
| $k_{11}$ (20° C.) = 13.0 pN | | |
| $k_{33}$ (20° C.) = 16.2 pN | | |
| $V_0$ (20° C.) = 2.37 V | | |

Example 19

The following mixture (M-19) is prepared and investigated.

| Mixture M-19 | | |
|---|---|---|
| Composition | | |
| Compound | | Concentration/ |
| No. | Abbreviation | % by weight |
| 1 | CY-3-O2 | 10.0 |
| 2 | CY-3-O4 | 8.0 |
| 3 | CY-5-O2 | 8.0 |
| 4 | CLY-2-O4 | 10.0 |

-continued

| Mixture M-19 | | |
|---|---|---|
| 5 | CLY-3-O2 | 7.0 |
| 6 | CLY-3-O3 | 10.0 |
| 7 | PY-3-O2 | 5.0 |
| 8 | CC-3-VV | 6.0 |
| 9 | CC-1V-V1 | 21.0 |
| 10 | CC-3-V | 15.0 |
| Σ | | 100.0 |

Physical properties

T (N, I) = 73.0° C.
$n_e$ (20° C., 589 nm) = 1.5728
Δn (20° C., 589 nm) = 0.0942
$ε_⊥$ (20°, 1 kHz) = 7.0
Δε (20°, 1 kHz) = −3.5
$γ_1$ (20° C.) = 97 mPa · s
$k_{11}$ (20° C.) = 14.2 pN
$k_{33}$ (20° C.) = 17..2 pN
$V_0$ (20° C.) = 2.35 V

Example 20

The following mixture (M-20) is prepared and investigated.

| Mixture M-20 | | |
|---|---|---|
| Composition | | |
| Compound | | Concentration/ |
| No. | Abbreviation | % by weight |
| 1 | CY-3-O2 | 22.0 |
| 2 | CY-5-O2 | 15.0 |
| 3 | CLY-3-O2 | 14.0 |
| 4 | CLY-3-O3 | 5.0 |
| 5 | CC-3-VV | 20.0 |
| 6 | CC-3-VV1 | 7.0 |
| 7 | CC-3-V | 17.0 |
| Σ | | 100.0 |

Physical properties

T (N, I) = 72.5° C.
$n_e$ (20° C., 589 nm) = 1.5690
Δn (20° C., 589 nm) = 0.0917
$ε_⊥$ (20°, 1 kHz) = 6.9
Δε (20°, 1 kHz) = −3.2
$γ_1$ (20° C.) = t.b.d. mPa · s
$k_{11}$ (20° C.) = t.b.d. pN
$k_{33}$ (20° C.) = t.b.d. pN
$V_0$ (20° C.) = t.b.d. V

Note:
t.b.d.: to be determined.

Example 21

The following mixture (M-21) is prepared and investigated.

| Mixture M-21 | | |
|---|---|---|
| Composition | | |
| Compound | | Concentration/ |
| No. | Abbreviation | % by weight |
| 1 | CY-3-O2 | 27.0 |
| 2 | CY-5-O2 | 13.0 |
| 3 | CLY-3-O2 | 15.0 |
| 4 | CLY-3-O3 | 8.0 |
| 5 | CC-3-VV | 9.0 |
| 6 | CC-3-VV1 | 6.0 |
| 7 | CC-3-V | 13.0 |
| 8 | CCP-V-1 | 9.0 |
| Σ | | 100.0 |

Physical properties

T (N, I) = 76.5° C.
$n_e$ (20° C., 589 nm) = 1.5759
Δn (20° C., 589 nm) = 0.0955
$ε_⊥$ (20°, 1 kHz) = 7.8
Δε (20°, 1 kHz) = −4.0
$γ_1$ (20° C.) = t.b.d. mPa · s
$k_{11}$ (20° C.) = t.b.d. pN
$k_{33}$ (20° C.) = t.b.d. pN
$V_0$ (20° C.) = t.b.d. V

Note:
t.b.d.: to be determined.

Mixtures M-17 to M-21 are characterized by a comparatively small or at least a relatively small wavelength dispersion of the birefringence, similar to those observed for the previous examples.

The invention claimed is:

1. A liquid-crystalline medium comprising
a) one or more compounds selected from the group of compounds of formulae I-1 and I-2

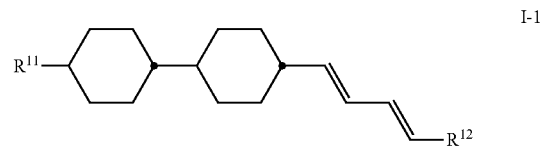

I-1

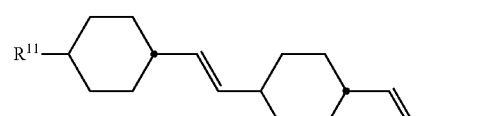

I-2 in which

R$^{11}$ and R$^{12}$ independently of each other denote H or alkyl with 1 to 5 C atoms, and b) one or more compounds selected from the group of compounds of formulae II and III

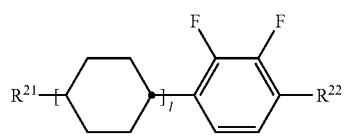
II

-continued

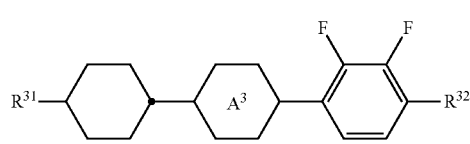
III in which

R$^{21}$ denotes an unsubstituted alkyl radical having 1 to 7 C atoms, an unsubstituted alkenyl radical having 2 to 7 C atoms or an unsubstituted alkoxy radical having 1 to 6 C atoms, R$^{22}$ denotes an unsubstituted alkyl radical having 1 to 7 C atoms, an unsubstituted alkoxy radical having 1 to 6 C atoms or an unsubstituted alkenyloxy radical having 2 to 6 C atoms, and l denotes 0 or 1, R$^{31}$ denotes an unsubstituted alkyl radical having 1 to 7 C atoms or an unsubstituted alkenyl radical having 2 to 7 C atoms, R$^{32}$ denotes an unsubstituted alkyl radical having 1 to 7 C atoms, an unsubstituted alkoxy radical having 1 to 6 C atoms or an unsubstituted alkenyloxy radical having 2 to 6 C atoms, and

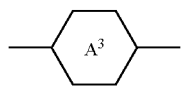

denotes

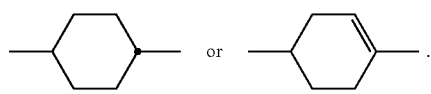

2. The medium according to claim 1, which comprises a compound of formula I-1.

3. The medium according to claim 1, which further comprises one or more compounds of formula IV

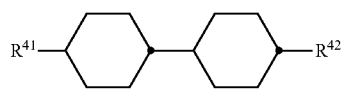
IV in which

R$^{41}$ denotes an unsubstituted alkyl radical having 1 to 7 C atoms or an unsubstituted alkenyl radical having 2 to 7 C atoms, and R$^{42}$ denotes an unsubstituted alkyl radical having 1 to 7 C atoms or an unsubstituted alkoxy radical having 1 to 6 C atoms.

4. The liquid-crystalline medium according to claim 1, which further comprises one or more compounds of formula V

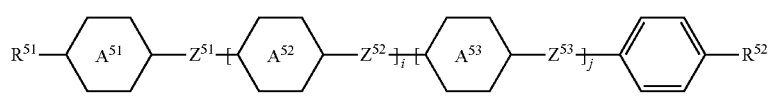
V in which

R$^{51}$ and R$^{52}$, independently of one another, denote an unsubstituted alkyl radical having 1 to 7 C atoms, an unsubstituted alkenyl radical having 2 to 7 C atoms, an unsubstituted alkoxy radical having 1 to 6 C atoms, or an unsubstituted alkenyloxy radical having 2 to 6 C atoms,

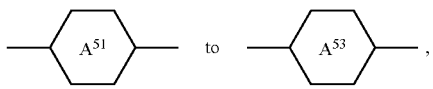

if present, each, independently of one another, denote

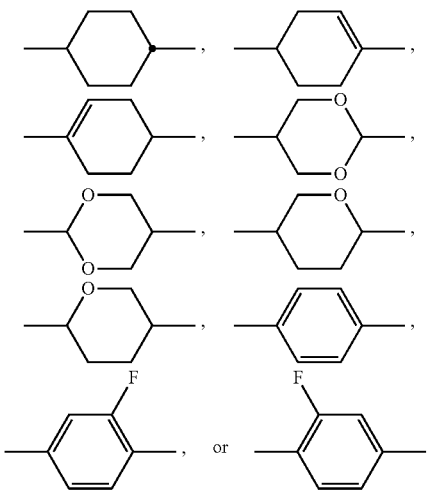

Z$^{51}$ to Z$^{53}$ each, independently of one another, denote —CH$_2$—CH$_2$—, —CH$_2$—O—, —CH=CH—, —C≡C—, —COO— or a single bond, and i and j each, independently of one another, denote 0 or 1.

5. The liquid-crystalline medium according to claim 1, wherein the one or more compounds of formula II and/or III are selected from the group of the compounds of formulae II-1, II-2, III-1 and III-2

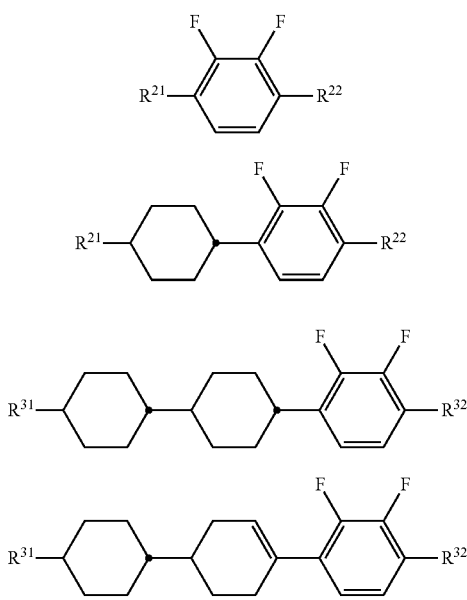

in which $R^{21}$, $R^{22}$, $R^{31}$, and $R^{32}$ as defined as for the compounds of formulae II and III.

6. The liquid-crystalline medium according to claim 5, in which comprises one or more compounds of formula II selected from the group of the compounds of formulae II-1 and II-2

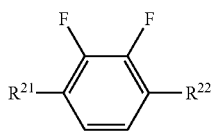

-continued

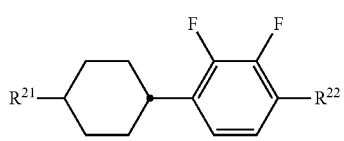

in which $R^{21}$ and $R^{22}$ are defined as for the compounds of formula II.

7. The medium according to claim 1, in which the total concentration of the compounds of formulae I-1 and I-2 in the medium as a whole is 5% or more to 35% or less.

8. The medium according to claim 1, in which the total concentration of the compounds of formula II in the medium as a whole is 25% or more to 45% or less.

9. The medium according to claim 1, which additionally comprises one or more chiral compounds.

10. An electro-optical display or electro-optical component, which comprises a liquid-crystalline medium according to claim 1.

11. A display according to claim 10, which is based on the VA-, ECB-IPS- or FFS mode.

12. The display according to claim 10, which contains an active-matrix addressing device.

13. A display according to claim 10, which is a mobile display.

14. A process for the preparation of a liquid-crystalline medium according to claim 1, comprising mixing together one or more compounds of formulae I-1 and I-2 with one or more compounds of formula II and/or III.

15. The medium according to claim 1, which comprises a compound of formula I-2.

16. The medium according to claim 1, which comprises at least one compound of each of the compounds of formulae I-1 and I-2.

17. The medium according to claim 1, which comprises at least one compound of each of the compounds of formulae II and III.

18. The medium according to claim 1, which further comprises one or more compounds of formula IV

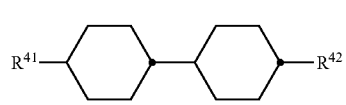

in which $R^{41}$ denotes an unsubstituted alkyl radical having 1 to 7 C atoms or an unsubstituted alkenyl radical having 2 to 7 C atoms, and $R^{42}$ denotes an unsubstituted alkyl radical having 1 to 7 C atoms or an unsubstituted alkoxy radical having 1 to 6 C atoms, and one or more compounds of formula V

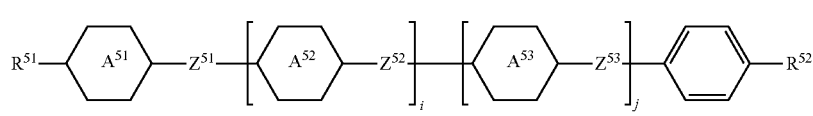

in which $R^{51}$ and $R^{52}$, independently of one another, denote an unsubstituted alkyl radical having 1 to 7 C atoms, an unsubstituted alkenyl radical having 2 to 7 C atoms, an unsubstituted alkoxy radical having 1 to 6 C atoms, or an unsubstituted alkenyloxy radical having 2 to 6 C atoms,

if present, each, independently of one another, denote

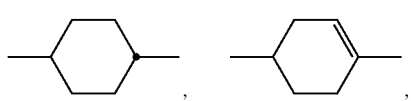

-continued

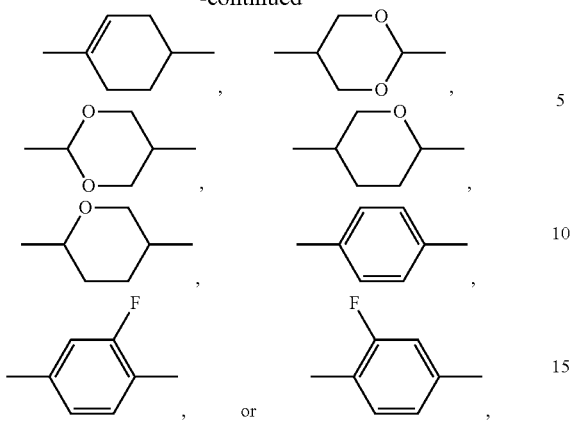

$Z^{51}$ to $Z^{53}$ each, independently of one another, denote —$CH_2$—$CH_2$—, —$CH_2$—O—, —CH=CH—, —C≡C—, —COO— or a single bond, and i and j each, independently of one another, denote 0 or 1.

19. The medium according to claim 18, which comprises at least one compound of each of the compounds of formulae II and III.

20. A process for the preparation of a liquid-crystalline medium according to claim 18, comprising mixing together one or more compounds of formulae I-1 and I-2 with one or more compounds of each of formula II, III, IV and V.

* * * * *